(12) United States Patent
Dozorets et al.

(10) Patent No.: US 11,706,260 B2
(45) Date of Patent: Jul. 18, 2023

(54) SECURITY ZONE POLICY ENFORCEMENT IN A CLOUD INFRASTRUCTURE SYSTEM

(71) Applicant: Oracle International Corporation, Redwood Shores, CA (US)

(72) Inventors: Igor Dozorets, Sammamish, WA (US); Thoulfekar Alrahem, Bellevue, WA (US); Jun Tong, Bellevue, WA (US); Leonid Kuperman, Toronto (CA); Nachiketh Rao Potlapally, McLean, VA (US); Bala Ganesh Chandran, Seattle, WA (US); Brian Pratt, Seattle, WA (US); Nathaniel Martin Glass, Bellevue, WA (US); Girish Nagaraja, Sammamish, WA (US); Jonathan Jorge Nadal, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/393,347

(22) Filed: Aug. 3, 2021

(65) Prior Publication Data
US 2022/0060517 A1    Feb. 24, 2022

Related U.S. Application Data

(60) Provisional application No. 63/068,943, filed on Aug. 21, 2020, provisional application No. 63/068,945, filed on Aug. 21, 2020.

(51) Int. Cl.
*H04L 9/40* (2022.01)
*H04L 67/10* (2022.01)

(52) U.S. Cl.
CPC ............ *H04L 63/205* (2013.01); *H04L 63/10* (2013.01); *H04L 63/102* (2013.01);
(Continued)

(58) Field of Classification Search
CPC ..... H04L 63/10; H04L 63/102; H04L 63/107; H04L 63/20; H04L 63/205; H04L 67/10
See application file for complete search history.

(56) References Cited

U.S. PATENT DOCUMENTS

| 10,341,410 B2 | 7/2019 | Lander et al. |
| 2009/0164649 A1* | 6/2009 | Kawato ............... G06F 21/6218 709/229 |

(Continued)

FOREIGN PATENT DOCUMENTS

EP    2880837 B1    10/2019

OTHER PUBLICATIONS

International Patent Application No. PCT/US2021/044456, International Search Report and Written Opinion dated Oct. 29, 2021, 21 pages.

*Primary Examiner* — Jeong S Park
(74) *Attorney, Agent, or Firm* — Kilpatrick Townsend & Stockton LLP

(57) ABSTRACT

A cloud-based security solution that provides a robust and secure framework for managing and enforcing security policies related to various resources managed in the cloud is disclosed. The cloud-based security solution is implemented by a security zone policy enforcement system in a cloud service provider infrastructure. The system receives a request to perform an operation on a resource and determines a compartment associated with the resource. The system determines that the compartment is associated with a security zone and determines a set of one or more security zone policies applicable to the resource. The system then determines that the operation on the resource is permitted based on the set of one or more security zone policies and responsive to determining that the operation on the resource is permitted, allows the operation to be performed on the resource.

21 Claims, 17 Drawing Sheets

(52) U.S. Cl.
CPC ............ *H04L 63/107* (2013.01); *H04L 63/20* (2013.01); *H04L 67/10* (2013.01)

(56) References Cited

U.S. PATENT DOCUMENTS

| | | | |
|---|---|---|---|
| 2014/0109103 A1* | 4/2014 | Proffit | G06F 9/505 |
| | | | 718/104 |
| 2014/0215555 A1 | 7/2014 | Barton et al. | |
| 2016/0028737 A1 | 1/2016 | Srinivasan et al. | |
| 2017/0093867 A1* | 3/2017 | Burns | H04L 63/107 |
| 2019/0197246 A1* | 6/2019 | Viswanathan | G06F 16/9537 |
| 2019/0384645 A1 | 12/2019 | Palavalli et al. | |

* cited by examiner

1000 ⟶

```
service: compute
 operations: [
  # LAUNCH_INSTANCE
  {
   id: LaunchInstance
   associatedResources: [
    {
     name: instance
     compartmentIdExpression: "request.body.compartmentId"
     isPrimary: true
    }
    {
     name: boot volume
     associationPredicate: "request.body.sourceDetails?.sourceType == 'bootVolume'"
     contextFetchExpression: "downstream.getOr404('blockstorage','GetBootVolume',request.body.sourceDetails.bootVolumeId)"
     compartmentIdExpression: "context['bootvolume'].compartmentId"
    }
    {
     name: image
     associationPredicate: "request.body.sourceDetails?.sourceType == 'image'"
     contextFetchExpression: "downstream.getOr404('compute-imaging','GetImage',request.body.sourceDetails.imageId)"
    }
    {
     name: subnet
     associationPredicate: "request.body.createVnicDetails?.subnetId != null"
     contextFetchExpression: "downstream.getOr404('virtualNetwork','GetSubnet',request.body.createVnicDetails.subnetId)"
     compartmentIdExpression: "context['subnet'].compartmentId"
    }
   ]
   context: {
    image: [
     {
      contextName: compartmentId
      contextValueExpression: "context['image']?.compartmentId"
     }
     {
      contextName: kmsKeyId
      contextValueExpression: "request.body.sourceDetails?.kmsKeyId"
     }
    ]
   }
  }
```

```
service: compute
operations: [
# ATTACH_VOLUME
 {
   id: AttachVolume
   associatedResources: [
     {
       name: instance
       contextFetchExpression: "downstream.getOr404('compute','GetInstance',splat.getOrThrow(request.body.instanceId, 'MissingParameter'))"
       compartmentIdExpression: "context['instance'].compartmentId"
       isPrimary: true
     }
     {
       name: volume
       contextFetchExpression: """
         downstream.getOr404(
         'blockstorage',
         splat.getEntityType(request.body.volumeId) == 'bootvolume' ? 'GetBootVolume' : 'GetVolume',
         splat.getOrThrow(request.body.volumeId, 'MissingParameter'))"""
       compartmentIdExpression: "context['volume'].compartmentId"
     }
   ]
   context: {
   }
 }
# ATTACH_BOOT_VOLUME
 {
   id: AttachBootVolume
   associatedResources: [
     {
       name: instance
       contextFetchExpression: "downstream.getOr404('compute','GetInstance',splat.getOrThrow(request.body.instanceId, 'MissingParameter'))"
       compartmentIdExpression: "context['instance'].compartmentId"
       isPrimary: true
     }
     {
       name: bootvolume
       contextFetchExpression:
"downstream.getOr404('blockstorage','GetBootVolume',splat.getOrThrow(request.body.bootVolumeId, 'MissingParameter'))"
       compartmentIdExpression: "context['bootvolume'].compartmentId"
     }
   ]
   context: {
   }
 }
# CHANGE_INSTANCE_COMPARTMENT
 {
   id: ChangeInstanceCompartment
   associatedResources: [
     {
       name: instance
       contextFetchExpression: "downstream.getOr404('compute','GetInstance',request.resourceId)"
       compartmentIdExpression: "context['instance'].compartmentId"
       destinationCompartmentIdExpression: "request.body.compartmentId"
       isPrimary: true
     }
   ]
   context: {
   }
 }
]
}
```

FIG. 11

```
1200                service: virtual network
                    operations: [
                      {
                        id: CreateSubnet
                        associatedResources: [
                          {
                            name: subnet
                            compartmentIdExpression: "request.body.compartmentId"
                            isPrimary: true
                          }
                        ]
                        context: {
                          subnet: [
                            {
                              contextName: prohibitPublicIpOnVnic
                              contextValueExpression: "request.body.prohibitPublicIpOnVnic ?: false"
                            }
                          ]
                        }
                      }
                      {
                        id: CreateInternetGateway
                        associatedResources: [
                          {
                            name: internetgateway
                            compartmentIdExpression: "request.body.compartmentId"
                            isPrimary: true
                          }
                        ]
                        context: {
                        }
                      }
                      {
                        id: ChangeSubnetCompartment
                        associatedResources: [
                          {
                            name: subnet
                            contextFetchExpression: "downstream.getOr404('virtualNetwork','GetSubnet',request.resourceId)"
                            compartmentIdExpression: "context['subnet'].compartmentId"
                            destinationCompartmentIdExpression: "request.body.compartmentId"
                            isPrimary: true
                          }
                        ]
                        context: {
                          subnet: [
                            {
                              contextName: prohibitPublicIpOnVnic
                              contextValueExpression: "context['subnet'].prohibitPublicIpOnVnic"
                            }
                          ]
                        }
                      }
                      {
                        id: ChangeInternetGatewayCompartment
                        associatedResources: [
                          {
                            name: internetgateway
                            destinationCompartmentIdExpression: "request.body.compartmentId"
                            isPrimary: true
                          }
                        ]
                        context: {
                        }
                      }
                    ]
```

FIG. 12

SECURITY ZONE POLICY ENFORCEMENT IN A CLOUD INFRASTRUCTURE SYSTEM

CROSS-REFERENCES TO RELATED APPLICATIONS

The present application is a non-provisional application of and claims the benefit and priority under 35 U.S.C. 119(e) of U.S. Provisional Application No. 63/068,943, filed Aug. 21, 2020 entitled "Secure Resource Provisioning in a virtual computing environment," and U.S. Provisional Application No. 63/068,945, filed Aug. 21, 2020 entitled "Secure Resource Provisioning in a virtual computing environment using intention based security policies," the entire contents of which are incorporated herein by reference for all purposes.

This application is also related to application Ser. No. 17/393,334, filed on the same day herewith, entitled "Centralized request processing and security zone policy enforcement in a cloud infrastructure system," the entire contents of which is hereby incorporated by reference as if fully set forth herein, under 35 U.S.C. § 120.

BACKGROUND

Generally, the use of cloud-based applications (e.g., enterprise public cloud applications, third-party cloud applications, etc.) is soaring, with access coming from a variety of devices (e.g., desktop and mobile devices) and a variety of users (e.g., employees, partners, customers, etc.). For businesses and enterprises making a transition into the cloud, it is imperative for a cloud service provider to be able to provide a robust security solution for its users. Cloud-based security services offer security solutions that allow businesses and enterprises to harness the many advantages of cloud computing while remaining secure and ensuring that data privacy and compliance requirements are met. Due to the abundant diversity and accessibility of cloud-based services and cloud-based applications, the volume of cloud resources that need to be securely managed by a cloud provider continues to rise rapidly. Existing cloud-based security services for securely configuring and managing resources in the cloud need to be improved to provide more robust, secure and reliable access to resources in the cloud.

BRIEF SUMMARY

The present disclosure relates generally to a cloud-based security solution. More specifically, but not by way of limitation, this disclosure describes a cloud-based security solution that provides a robust and secure framework for managing and enforcing security policies related to various resources managed in the cloud.

In certain embodiments, a security zone policy enforcement system in a cloud service provider infrastructure is disclosed. The security zone policy enforcement system receives a request to perform an operation on a resource and determines a compartment associated with the resource. The system determines that the compartment is associated with a security zone and determines a set of one or more security zone policies applicable to the resource. The system then determines that the operation on the resource is permitted based on the set of one or more security zone policies and responsive to determining that the operation on the resource is permitted, allows the operation to be performed on the resource.

In certain examples, the system determines a compartment identifier of the compartment associated with the resource and a set of one or more compartment policies applicable to the resource. The set of one or more compartment policies applicable to the resource comprise a union of one or more compartment policies associated with the compartment and one or more compartment policies associated with one or more parent compartments that are hierarchically related to the compartment.

In certain examples, the system determines that the operation on the resource is permitted based on the set of one or more compartment policies and responsive to determining that the operation on the resource is permitted based on the set of one or more compartment policies, determines that the compartment is associated with the security zone.

In certain examples, the system comprises determining that the operation on the resource is not permitted based on the set of one or more compartment policies and responsive to the determining, disallows the operation to be performed on the resource. In certain examples, the system comprises determining that the operation on the resource is not permitted based on the set of security zone policies and responsive to the determining, disallows the operation to be performed on the resource.

In certain examples, the set of one or more security zone policies applicable to the resource comprise a union of one or more security zone policies associated with the security zone and one or more security zone policies associated with one or more parent security zones that are hierarchically related to the security zone.

In certain examples, a security zone policy in the set of one or more security zone policies is represented as a set of one or more expressions. Each expression in the set of expressions comprises a set of one or more conditions and each condition in the set of one or more conditions specifies a restriction on the operation to be performed on the resource. In certain examples, the restriction specifies criteria requiring encryption of the resource, criteria that restricts a movement of the resource from the compartment that the resource resides in or criteria that prohibits that resource from being accessible from the public internet. In certain examples, the restriction specifies criteria related to one or more secondary resources associated with the resource, where the one or more secondary resources impact the operation of the resource. In certain examples, the set of one or more security zone policies prohibit a specific configuration of the operation to be performed on the resource.

In certain examples, the system transmits a result to a user indicating that the operation was successfully performed on the resource. In certain examples, the result indicates that the operation was not successfully performed on the resource.

In certain examples, the system receives a request to associate a compartment with a security zone. The compartment is associated with a set of one or more compartment policies. Responsive to the request, the system associates the compartment with the security zone. The security zone is associated with a set of one or more security zone policies. As a result of the associating, the compartment is associated with the set of one or more security zone policies and the set of one or more compartment policies. In certain examples, the system receives a request to add a resource to the compartment and responsive to the request, determines access to the resource based at least in part on the set of one or more compartment policies and the set of one or more security zone policies. In certain examples, the set of one or more security zone policies prohibit a set of operations to be performed on the resource or prohibit a specific version of an operation to be performed on the resource.

In certain embodiments, a centralized application programming interface (API) request processing system in a cloud service provider infrastructure (CSPI) is disclosed. The API request processing system receives an API request that identifies an operation to be performed on a resource in the CSPI. The system determines, from the API request, compartment information and context information associated with the resource. Responsive to determining the compartment information and the context information associated with the resource, the system determines that the resource resides in a compartment that is associated with a security zone. The system then processes the API request and transmits a result of processing of the API request to a user of the centralized API processing system.

In certain examples, the system determines, from the API request, a primary resource. In certain examples, the primary resource is the resource identified in the API request. The system determines a secondary resource that is impacted by the API request. The secondary resource is a resource that is associated with the primary resource. In certain examples, the secondary resource is not identified as part of the API request.

In certain examples, the compartment information comprises a compartment identifier and a set of one or more compartment policies associated with the primary resource identified in the API request. In certain examples, the context information is associated with the secondary resource impacted by the API request. The context information may comprise a resource identifier associated with the secondary resource, a compartment identifier associated with the secondary resource, or a resource state associated with the secondary resource. In certain examples, context information identifies a downstream service in the CSPI configured to execute the API request.

In certain examples, the system determines, based on the compartment information and the context information associated with the resource, that the operation is permitted to be performed on the resource identified in the API request and responsive to the determining, determines that the resource resides in a compartment that is associated with a security zone. In certain examples, the processing of the API request by the centralized API processing system comprises transmitting the API request and the compartment information associated with the resource to a security zone policy enforcement system for processing. The processing further comprises receiving, by the centralized API processing system, a result of processing of the API request from the security zone policy enforcement system. In certain examples, the result indicates that the operation is permitted to be performed on the resource. In certain examples, the result indicates that the operation is not permitted to be performed on the resource. In certain examples, the centralized API processing system transmits the result to a user. In certain examples, processing the API request comprises evaluating, by the security zone policy enforcement system, a set of one or more security zone policies associated with the security zone of the compartment.

In certain examples, the system determines that the user is authorized to perform the operation on the resource identified in the API request prior to determining the compartment information and the context information associated with the resource. In certain examples, the compartment information and the context information associated with the resource is stored in a security zone specification associated with the API request.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 10 is an example of a secure zone specification corresponding to an API request that identifies an operation for launching a compute instance resource using a compute service in the CSPI shown in FIG. 6, according to certain embodiments.

FIG. 11 is an example of a secure zone specification corresponding to an API request that identifies operations for attaching a volume to an instance, attaching a boot volume to an instance and changing the compartment identifier for an instance using a compute service in the CSPI, according to certain embodiments.

FIG. 12 is an example of a security zone specification corresponding to an API request that identifies operations for creating a subnet, creating an internet gateway, changing the compartment identifier for a subnet and changing the compartment identifier for the internet gateway using a compute service in the CSPI, according to certain embodiments.

DETAILED DESCRIPTION

Figure 1:
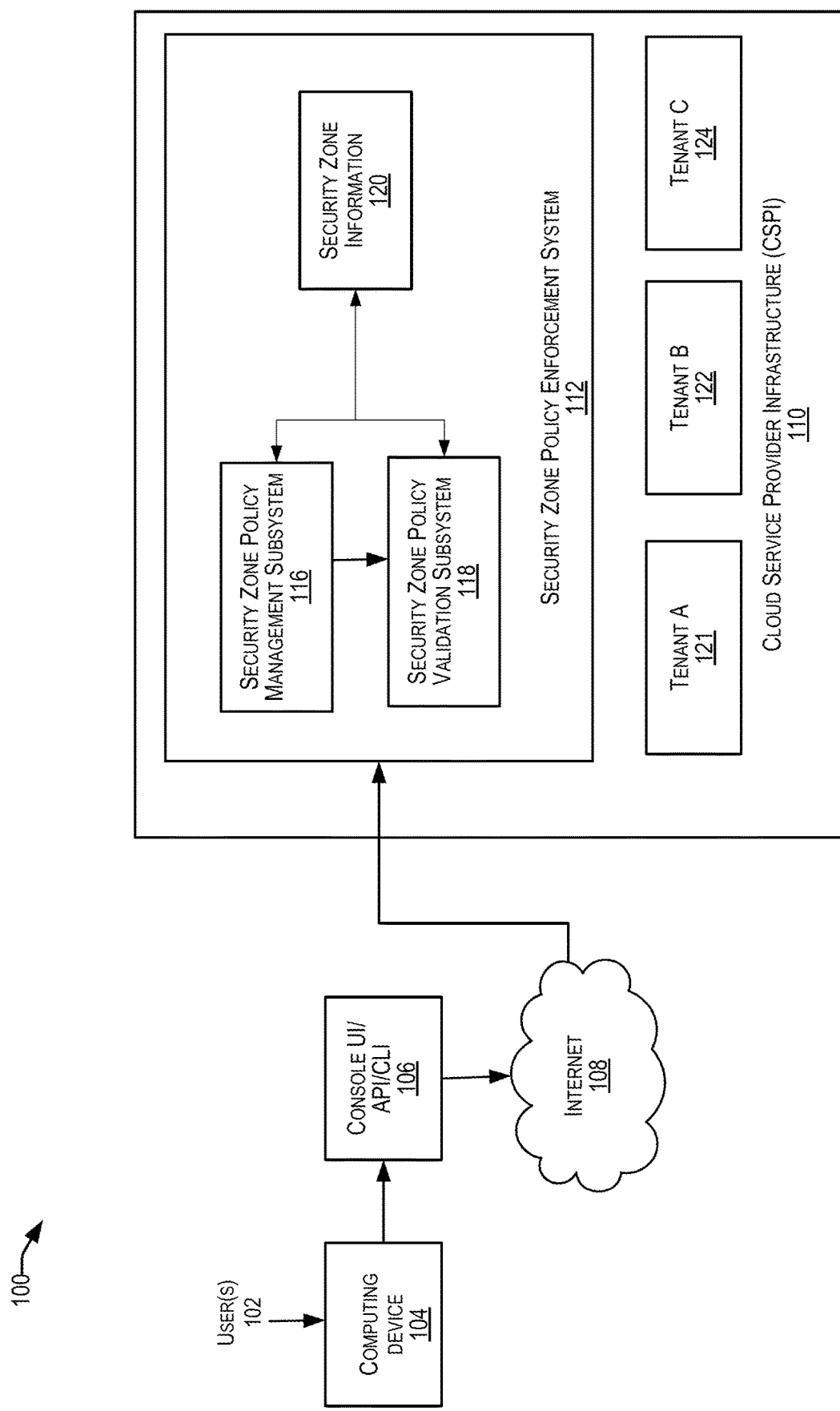
FIG. 1 depicts a high level diagram of a computing environment comprising a cloud service provider infrastructure (CSPI) that includes capabilities for providing a secure framework for managing and enforcing security policies related to various resources managed by the CSPI, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to a cloud-based security solution. More specifically, but not by way of limitation, this disclosure describes a cloud-based security solution that provides a robust and secure framework for managing and enforcing security policies related to various resources managed in the cloud.

Cloud data security is becoming increasingly important as more and more enterprises move their data centers and applications into the cloud every day. Cloud-based security solutions ensure that quality cloud data security is achieved for its users through comprehensive data security policies. For example, Identity and Access Management (IAM) is a common type of security solution provided in the cloud. IAM techniques ensure cloud data security by defining policies by which user identities can be managed to regulate the users' access to resources in the cloud. IAM policies may be configured to define user roles that limit the ability of users to access resources they are not entitled to access and/or limit a user's ability to perform certain actions/operations in the cloud.

Existing cloud-based security solutions are limited in their capabilities to provide users with a robust and secure framework for configuring, accessing, and managing resources (e.g., network, server, storage, applications, and services) in the cloud. For instance, cloud-based security solutions that employ IAM policies are generally user/group specific and are tied to the identity of the user requesting access. For example, an administrator of an enterprise or a cloud provider can customize the access privileges of a certain set of users (e.g., users that belong to a particular department within the enterprise) so that a specific group of users can always be provided access to certain resources based on their role/identity within the enterprise. This may compromise the overall security needs of the enterprise especially if the enterprise is required to ensure that access is tightly regulated to provide robust data security controls for the enterprise. Additionally, the use of IAM techniques requires an administrator of the enterprise or the cloud to maintain updated and synchronized information of all its users. This entails the management of sensitive identity information and raises privacy concerns for an enterprise.

The cloud-based security solution described in the present disclosure provides several technical advancements and/or improvements over conventional cloud-based security services. The cloud-based security solution provides a robust and secure framework for managing and enforcing security policies related to various resources managed by a cloud service provider (CSP). The disclosed secure framework comprises a set of security zones and security zone policies that can be enforced on a set of resources in the cloud that are accessed by users of an enterprise. The access to the set of resources is governed by the set of security zone policies and not tied to the identity of a user accessing the resources. Thus, a user who may be permitted by an IAM policy to access a certain resource (and/or to perform operations on the resource) may be denied access by the disclosed security solution if the set of security zone policies associated with the resource are violated. The security zone policies are based on "deny semantics" that aim at disallowing certain actions or operations to be performed on a set of resources by any user of the enterprise. The security zone policies are irrevocable, user-agnostic, intention-based and support parameterization and deny semantics. This is in contrast to the traditional "allow semantics" employed by existing IAM authorization policies that allow a particular user to perform a certain action on a resource based on the role/identity of the user within the enterprise.

In certain examples, the disclosed cloud-based security solution is implemented by a security zone policy enforcement system within a cloud services provider infrastructure (CSPI) that is made available by the CSPI to users or customers on demand (e.g., via a subscription model) using systems and infrastructure (cloud infrastructure) provided by the CSP. The disclosed security zone policy enforcement system provides users of an enterprise with a robust and secure framework for securely configuring, accessing, and managing their resources in the cloud. The resources may include, without limitation, compute, networking, object storage, or database resources hosted in a distributed environment by the CSPI. Details related to the implementation and processing performed by the security zone policy enforcement system is described in the figures below and their accompanying description.

Security Zone Policy Enforcement System in a Cloud Service Provider Infrastructure (CSPI)

Referring now to the drawings, FIG. 1 depicts a high level diagram of a computing environment 100 comprising a cloud service provider infrastructure (CSPI) 110 that includes capabilities for providing a secure framework for managing and enforcing security policies related to various resources managed by the CSPI, according to certain embodiments. In certain embodiments, the secure framework is provided by a security zone policy enforcement system 112 within the CSPI 110. The resources managed by the CSPI may include, without limitation, compute, networking, object storage, or database resources that are hosted in a distributed environment by the CSPI 110. A user 102 of the CSPI 110 can build their own networks using these resources. For example, a user can use the resources provided by the CSPI 110 to build one or multiple customizable and private network(s) referred to as virtual cloud networks (VCNs) (also referred to herein as "virtual customer networks"). A user can deploy one or more resources, such as compute instances, on these VCNs. Compute instances can take the form of virtual machines, bare metal instances, and the like.

The security zone policy enforcement system 112 may be implemented by one or more computing systems that execute computer-readable instructions (e.g., code, program) to implement the security zone policy enforcement system 112. As depicted in FIG. 1, the security zone policy enforcement system 112 includes various subsystems including a security zone policy management subsystem 116 and a security zone policy validation subsystem 118. Portions of data or information used by or generated by the security zone policy enforcement system 112 as part of its processing may comprise security zone information 120, which may be stored by the security zone policy enforcement system 112 in one or more databases or files. The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The security zone policy enforcement system 112 may be implemented in various different configurations. In the embodiment depicted in FIG. 1, the security zone policy enforcement system 112 is implemented on one or more servers in the CSPI 110 and its secure resource access and management services may be provided to subscribers of cloud services on a subscription basis. Computing environment 100 depicted in FIG. 1 is merely an example and is not intended to unduly limit the scope of claimed embodiments. One of ordinary skill in the art would recognize many possible variations, alternatives, and modifications. For example, in some implementations, the security zone policy enforcement system 112 can be implemented using more or fewer subsystems than those shown in FIG. 1, may combine two or more subsystems, or may have a different configuration or arrangement of subsystems.

In the embodiment depicted in FIG. 1, the security zone policy enforcement system 112 comprises a security zone policy management system 116 and a security zone policy validation subsystem 118. The security zone policy management system 116 includes capabilities for providing a secure framework for managing security policies related to various resources (e.g., compute, networking, object storage, or database resources) in the CSPI. In certain examples, the secure framework provided by the security zone policy management system 116 comprises security zone information 120 that may be composed of a set of security zones and a set of security zone policies associated with the set of security zones. A "security zone" may refer to a specialized zone in a secure framework managed by the security zone policy management subsystem 116 that is designed to enforce implicit and explicit security zone policies on a set of resources that reside in a compartment in the CSPI 100. The security zone policies prevent certain operations that violate the security requirements defined by the security zone to be performed on a set of resources residing in a compartment. A "compartment" may refer to a logical container that is used to organize and control access to resources managed by the CSPI 110. A compartment may be associated with a set of compartment policies that restrict the usage of resources that reside in the compartment. Each policy in the set of compartment policies may impact one or more resources such as compute, networking, object storage, and database resources within the CSPI. The resources within a compartment may be logically organized according to various criteria. For instance, resources within a compartment may be logically organized based on specific services (e.g., compute, memory, and networking services) provided by the CSPI, based on departments (engineering, human resources, IT etc.) within the user's enterprise and so on. The criteria may be specified by a user (e.g., an administrator) 102 associated with a customer/tenant (e.g., 120, 122 or 124) of the CSPI 110. An example of a secure framework comprising security zones and security zone policies implemented by the security zone policy management system 116 is described in detail in FIG. 2.

In certain embodiments, the security zone policy management system 116 includes capabilities to associate a compartment with a security zone, add resources to a compartment that is associated with a security zone, view security zone policies associated with a security zone, designate a security zone as a "maximum security zone" and so on. A "maximum security zone" may represent a security zone that is configured to include all the available security zone policies defined by the security zone policy enforcement system. A compartment that is associated with a security zone automatically inherits a set of security zone policies associated with the security zone. In certain examples, the security zone policies represent an additional layer of security policies that may be enforced on a set of resources residing in the compartment in addition to the compartment policies associated with the compartment. The security zone policies may prohibit an entire set of operations to be performed on a set of resources residing in a compartment, prohibit a subset of operations to be performed on the set of resources or prohibit a specific version/configuration of an operation to be performed on the set of resources. By way of example, a user may have permission to create a resource (e.g., a compute instance) in a compartment with a public Internet Protocol (IP) address based on the compartment policies associated with the compartment but may not be permitted to create the resource with a public IP address based on the security zone policies associated with the compartment. In certain examples, the security zone policies can also be applied to users, compartments and other entities in addition to resources. Additional details of the implementation of security zone polices by the security zone policy management system 116 is described in FIG. 2.

The security zone policy validation subsystem 118 includes capabilities for evaluating whether an operation can be performed on a resource that resides in a compartment that is associated with a security zone. Based on the evaluation, the security zone policy validation subsystem 118 may permit or deny a user of the CSPI 110 the ability to perform the operation on the resource. For example, the security zone policy validation subsystem 118 may forbid a user from trying to access a resource from the public internet, ensure that a resource created by a user is encrypted using a customer-managed key and so on.

In certain examples, a user 102 of the CSPI 110 may interact with the security zone policy enforcement system 112 using a computing device 104 that is communicatively coupled to the CSPI 110, possibly via one or more communication networks. The computing device may be of various types, including but not limited to, a mobile phone, a tablet, a desktop computer, and the like. A user 102 may be associated with a customer or tenant (e.g., 120, 122 or 124) of the CSPI 110 who wishes to utilize the services provided by the security zone policy enforcement system 112 to securely manage and access resources within the CSPI. A user may interact with the security zone policy enforcement system 112 using a console User Interface (UI), via Application Programming Interfaces (APIs) or via a command line interface (CLI) 106 connected to the user's computing device (e.g., 104) to securely manage and access resources deployed in the CSPI 110. For instance, the console UI may be a web-based user interface (UI) (or a web based application) provided by the security zone policy enforcement system 112 to enable the user to interact with the security zone policy enforcement system 112 to securely access and manage their resources in the CSPI. By way of example, the user may interact with the security zone policy enforcement system 112 to create compartments, associate a compartment with a security zone, add resources to a compartment, view security zone policies associated with a security zone, delete a compartment, create sub-compartments within a compartment, move a compartment to a different parent compartment within the same tenancy, designate a security zone as a "maximum security zone" and so on.

In certain examples, the security zone policy enforcement system 112 may be configured to receive a request to perform an operation on a resource from a user. For instance, the user may transmit a request via the UI connected to the user's device to create or launch a virtual machine instance in the user's VCN. The security zone policy enforcement system 112 may process the request and transmit a result of the processing to the user. The result may include information that the operation was successfully able to be performed on the resource, a message that the operation could not be performed because of a policy violation and possibly other information included in the results. The result may be output to a user, for example, via the UI connected to the user's device 104.

Figure 2:
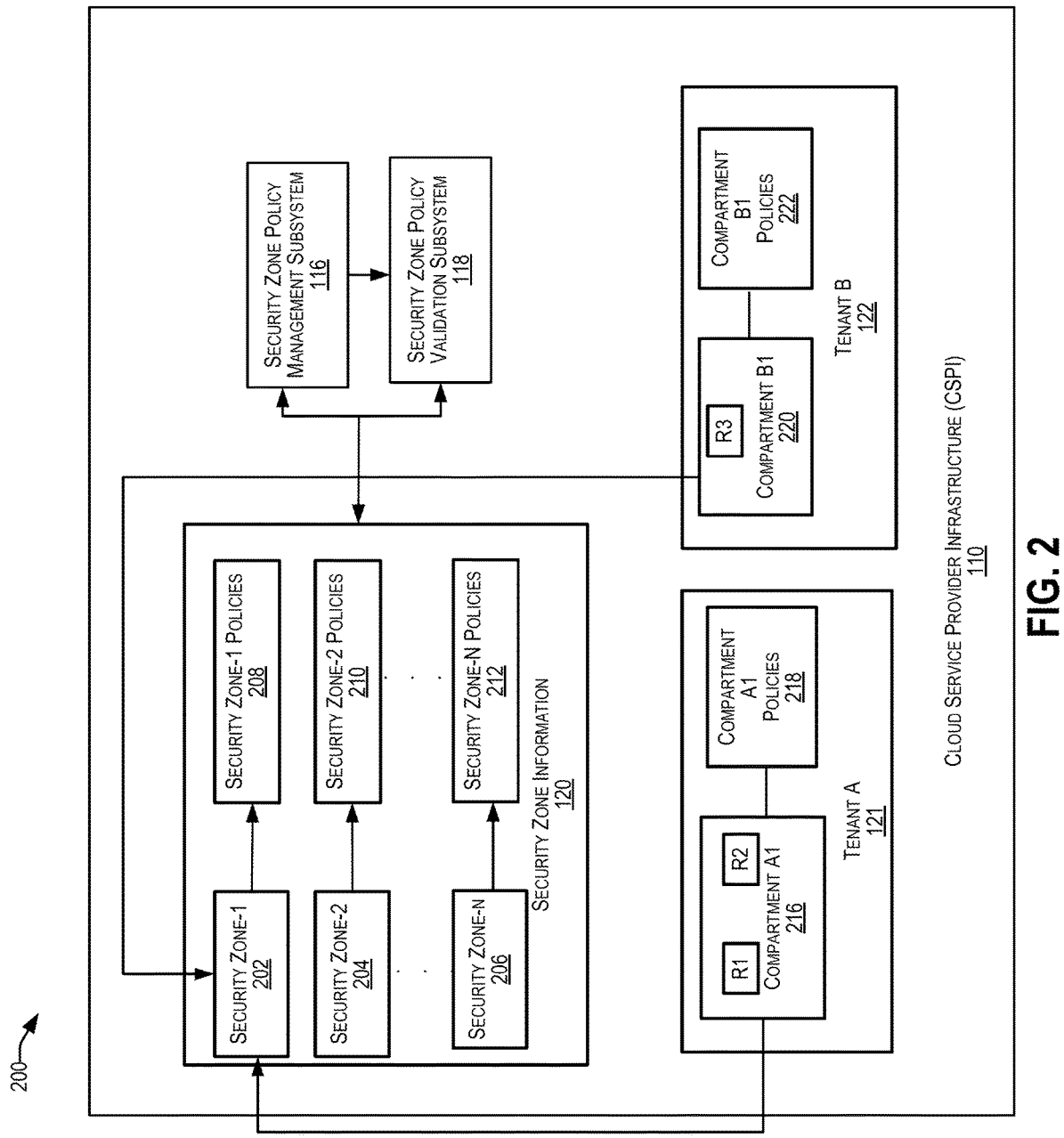
FIG. 2 is an exemplary illustration of a computing environment 200 comprising a secure framework provided by the security zone policy management system 116 shown in FIG. 1, according to certain embodiments.

FIG. 2 is an exemplary illustration of a computing environment 200 comprising a secure framework provided by the security zone policy management system 116 shown in FIG. 1, according to certain embodiments. In certain examples, the secure framework comprises security zone information 120 that is composed of a set of security zones 202, 204 and 206 and a set of security zone policies 208, 210 and 212 associated with the set of security zones. As previously described, a "security zone" may refer to a specialized zone designed to enforce implicit and explicit security zone policies that prevent operations that violate security requirements defined by the security zone to be performed on a set of resources residing in a compartment. In certain implementations, a security zone policy (e.g., 208, 210 or 212) associated with a security zone (e.g., 202, 204 or 206) may be represented as a set of one or more expressions, where each expression comprises a set of one or more conditions. Each expression may evaluate to true or false and perform a logical "and" on the conditions they contain. In certain examples, each condition may specify a restriction on a certain operation that can be performed on a resource within the CSPI. The security zone policy executes a logical "or" on all the expressions it contains so if any expression is true, the security zone policy returns a true value. A true evaluation for a security zone policy indicates a violation which results in blocking the user's action/requested operation to be permitted on a resource.

By way of example, a security zone policy requiring an object storage resource (e.g., an object storage bucket) in a security zone to have a certain type of encryption is shown below:

Security Zone Policy(object storage resource)=expr1
(context.part1)|expr2(context.part2) where:

expr1(context.part1)=condition
1(Bucket.Encryption.Type=Symmetric)& condition 2(Bucket.Encryption.Key.Size<512) and expr2(context.part2)=condition
1(Bucket.Encryption.Key.Type!=customer-managed)

In the above example, the first expression, expr1 (context.part11) represented by the security zone policy comprises a first condition, condition 1(Bucket.Encryption.Type=Symmetric) and a second condition, condition 2(Bucket.Encryption.Key.Size<512). Expression 1 restricts the use of a key that is both symmetric and that has a key less than 512 bytes. The second expression, expr2 (context.part2) represented by the security zone policy restricts the use of a key that is not customer-managed and comprises one condition that enforces a requirement that the object storage resource (bucket) should be created using customer-managed master encryption keys.

Each expression, expr1(context.part1) and expr2 (context.part2) evaluates to true or false by performing a logical "and" on the conditions they contain. For instance, the first expression, expr1(context.part1), denies users the ability to create an object storage resource using symmetric encryption with a key size of less than 512 bit keys. The second expression expr2 (context.part2) denies users the ability to create an object storage resource comprising default encryption keys. The security zone policy for the object storage resource runs a logical "or" on all expressions so if any expression is true, the policy returns a true value. A true evaluation for the security zone policy indicates a violation which results in blocking the user's action, i.e. it prevents the user from creating an object storage resource using symmetric encryption with a key size of less than 512 bit keys or create the object storage resource using default encryption keys.

In an alternate implementation, based on the structure of the metadata of the resource, an expression for a security zone policy for an object storage resource may also be represented using wildcard characters as shown below:

*.Encryption.Type=Symmetric && *.Encryption-
.Key.Size<512                                                    Expr 1:

In yet another implementation, an expression for a security zone policy for a resource (e.g., an object storage resource) may be represented as shown below:

Encryption.Type=Symmetric && Encryption.Key-
.Size<512                                                              Expr 1:

In certain examples, a security zone policy (e.g., 208, 210 or 212) may belong to a specific security zone policy category. Each security zone policy category comprises policies that prohibit a certain set of operations to be performed on a set of resources. The different security zone policy categories may include, for instance, an access restriction security zone policy category, a data security/data encryption security zone policy category, a resource association restriction security zone policy category, a resource movement restriction security zone policy category or a data durability security zone policy category. The various security zone policy categories are described below.

Access Restriction Security Zone Policies

Examples of policies that belong to this category include policies that prohibit resources created in a security zone to be accessible from the public internet. For instance, policies in this category ensure that subnets in a security zone cannot be made public, internet gateways cannot be added to a virtual cloud network (VCN) within a security zone, object storage buckets created in a security zone cannot be made public, databases in a security zone cannot be assigned to public subnets and so on.

Data Security/Data Encryption Security Zone Policies

Examples of policies in this category include policies requiring resources in a security zone to be encrypted using customer-managed keys and policies requiring that data be encrypted while in transit and at rest. For instance, policies in this category ensure that resources such as block volumes, boot volumes, object storage buckets and databases created in a security zone use customer-managed master encryption keys as opposed to default encryption keys managed by the service. Additionally, policies in this category ensure that block volumes, boot volumes, object storage buckets and databases created in a security zone are encrypted using keys with a specific number of bits.

Resource Association Restriction Security Zone Policies

Examples of policies in this category include policies requiring that components (e.g., secondary resources) of a resource (e.g., a primary resource) that impact the security posture of a primary resource must also be located in a security zone. For instance, policies in this category ensure that all block storage volumes/boot volumes attached to a compute instance in a security zone must themselves be in a security zone, a compute instance that is not in a security zone cannot be attached to block storage volumes/boot volumes that are in a security zone, a block volume/boot volume cannot be moved to a security zone if it is attached to a compute instance that is not in a security zone, a compute instance in a security zone must use subnets that are also in a security zone, a database in a security zone must use subnets that are also in a security zone and so on.

Resource Movement Restriction Security Zone Policies

Examples of policies in this category include policies to ensure the integrity of data by disallowing movement of certain resources from a security zone to a standard compartment because it might be less secure, disallowing movement of existing resources from a standard compartment to a security zone unless all security zone policies are met and so on. For instance, policies in this category may ensure that block volumes/boot volumes, compute instances, subnets, buckets, or databases cannot be moved from a security zone to a standard compartment.

Data Durability Security Zone Policies

Examples of policies in this category include policies that ensure that automatic backups must be performed regularly for resources created in a security zone. For instance, policies in this category ensure that a database backup in a security zone cannot be used to create a database that is not in a security zone, a database in a security zone cannot be cloned to create a database that is not in a security zone and so on.

Returning to the discussion of FIG. 2, and as previously described, the security zone policy management system 116 may be configured with capabilities to manage a secure framework comprising security zone information 120 that is composed of a set of security zones (202, 204 and 206) and their associated security zone policies (208, 210 and 212). The security zone policy management system 116 may additionally include capabilities for associating a compartment with a security zone, adding resources to a compartment, viewing security zone policies associated with a security zone, deleting a compartment, creating sub-compartments within a compartment, moving a compartment to a different parent compartment within the same tenancy, designating a security zone as a maximum security zone and so on. For instance, in the embodiment depicted in FIG. 2, a compartment A1 216 may be created by a user of a first tenant A 121 of the CSPI 110 and is associated with a set of compartment policies 218. Similarly, the compartment B1 220 may be created by a user of a second tenant B 122 and is associated with a set of compartment policies. Additionally, in this embodiment, the compartment A1 216 and the compartment B1 220 are both associated with the security zone-1 202.

As previously described, the creation of a compartment and the association of a compartment to a security zone may be performed by a user of a customer or tenant of the CSPI 110 by transmitting a request to the security zone policy management subsystem 116 via a console UI, via APIs or via a CLI 106 connected to the user's computing device. Upon receiving the user's request, the security zone policy management subsystem 116 creates the compartment and associates the compartment with the security zone. Upon association of a compartment (216 or 220) with a security zone (e.g., security zone-1 202), the compartment automatically inherits the set of security zone policies (e.g., 208) associated with the security zone. In certain embodiments, a compartment that is associated with a security zone may be referred to herein as a "security zone compartment." A user may then add resources to the security zone compartment. Any resource that is added to the security zone compartment is automatically associated with (i.e., automatically inherits) the security zone policies associated with the security zone in addition to the set of compartment policies associated with the compartment.

In the embodiment depicted in FIG. 2, the compartment A1 216 of tenant A 121 and the compartment B1 of tenant B 122 are both associated with the same security zone-1 202. In certain implementations, a compartment A1 216 of tenant A 121 and a compartment B1 220 of tenant B 122 may be associated with different security zones. For example, the compartment A1 216 may be associated with a security zone-1 202 and the compartment B1 220 may be associated with a different security zone-2 204. Additionally, the secure framework comprising the security zone information 120 depicted in FIG. 2 is depicted as a generic framework that is accessible to and shared by the various tenants of the CSPI 110. In alternate embodiments, the security zone information 120 may be tenant specific and be defined on a per-tenant basis. The secure framework depicted in FIG. 2 is merely an example and is not intended to unduly limit the scope of claimed embodiments. One of ordinary skill in the art would recognize many possible variations, alternatives, and modifications. For example, other implementations are possible where multiple compartments may be associated with a tenant, the multiple compartments may be associated with the same/or different security zones, a compartment may be associated with more than one security zone and so on. In certain implementations, the security zone information 120 comprising security zones and security zone policies may be defined by either an administrator of the CSPI 110 or by the users of the tenants of the CSPI 110.

In certain implementations, the security zones depicted in FIG. 2 may be hierarchically related to each other. For instance, in one example, the security zone-1 202 and the security zone-2 204 may be hierarchically related where security zone-1 202 is a parent security zone of child security zone-2 204. In this example, if a compartment A1 216 is associated with the security zone-2 204, it becomes automatically associated with the security zone-1 202 and thus inherits the security zone policies 210 associated with the security zone-2 204. Continuing with this example, in a certain implementation, if the set of security zone policies 208 associated with the security zone-1 202 belong to the "access restriction" category and the set of security zone policies 210 associated with the security zone-2 204 belong to the "data encryption" category, when a resource R1 or R2 is added to the compartment A1 216, the resources are automatically associated with both the "data encryption" security zone policies and the "access restriction" security zone policies in addition to the compartment policies associated with the compartment A1 216 that the resources reside in. The association of resources in a compartment to one or more security zones and their associated security zone policies prohibit a user from being able to perform certain operations on the resources that reside in a compartment if the operations violate the security requirements defined by the security zone policies.

In certain examples, the security requirements defined by a security zone policy may prohibit an entire set of operations that can be performed on a resource residing in a compartment, prohibit a subset of operations that can be performed on the resource or prohibit a specific version/configuration of an operation that can be performed on the resource. For instance, a set of operations (O1 . . . On) may be permitted to be performed on the resource R1 based on IAM policies associated with the resource. When resource R1 is added to a compartment A1 216, the set of operations that may be permitted to be performed on R1 may be reduced to a subset of operations (O1, O2, O5) that are allowed by the compartment policies associated with the compartment. The compartment policies associated with a compartment may thus represent a first filter on a set of operations that may be permitted to be performed on the resource residing in the compartment.

Figure 5A:
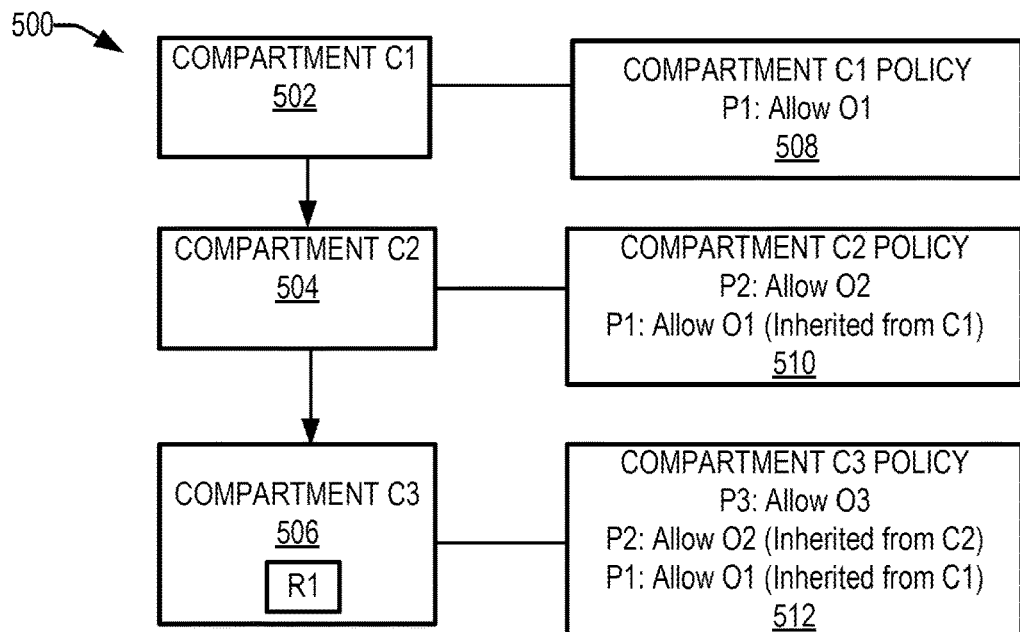
FIG. 5A is an exemplary illustration of the inheritance of compartment policies by a compartment created by a user of a tenant of the CSPI shown in FIG. 1, according to certain embodiments.
Figure 5B:
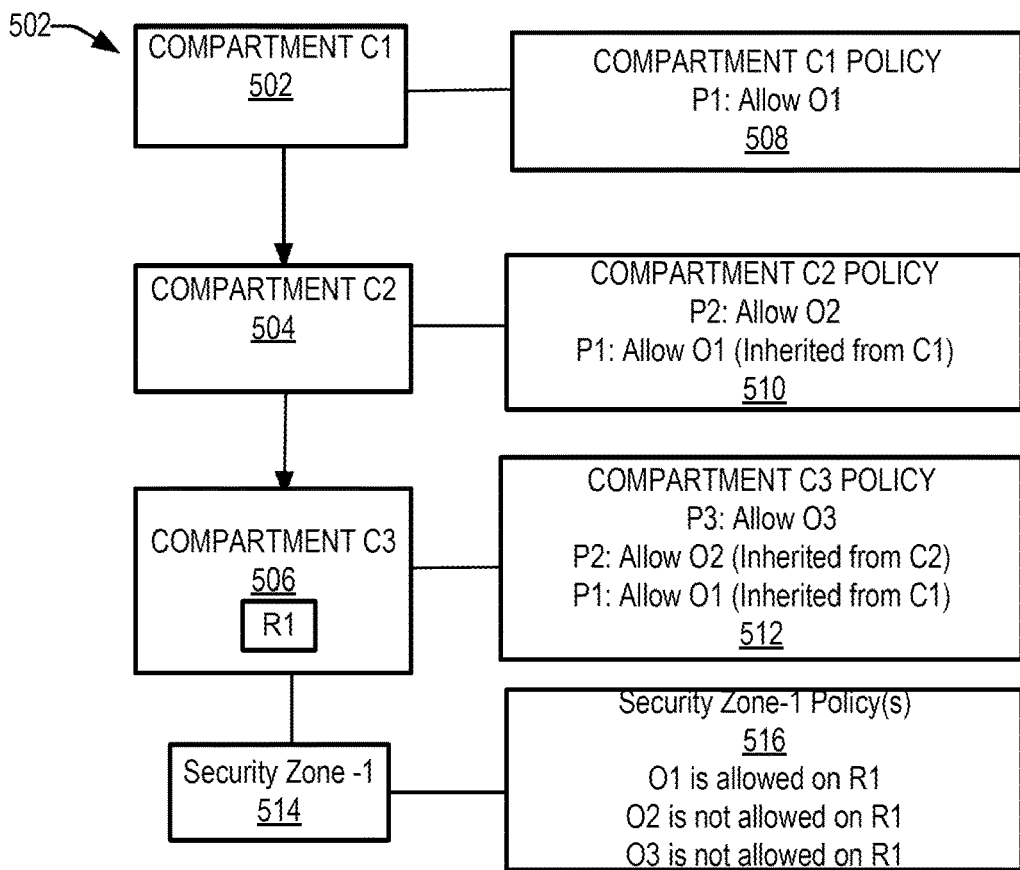
FIG. 5B is an exemplary illustration of the inheritance of security zone policies associated with a security zone by a compartment created by a tenant of the CSPI shown in FIG. 1, according to certain embodiments.

When the compartment A1 216 becomes associated with a security zone (e.g., security zone-1 202) it additionally inherits the security zone policies of the security zone as well as the security zone policies associated with any security zones that are hierarchically related to the security zone. Based on the above example, the set of operations that may be permitted to be performed on R1 may now be further reduced to an even smaller subset of operations (e.g., O1) based on the security zone policies. Thus, the security zone policies may represent a second or additional filter on the set of operations that may be permitted to be performed on resources residing in the compartment. An exemplary illustration of the association of a security zone and its associated security policies to a compartment is depicted in FIG. 5B.

In certain examples, the security zone policies may prohibit a specific configuration of an operation (e.g., O1) that can be performed on a resource residing in a compartment. By way of example, a compartment policy for R1 residing in compartment A1 216 may permit a user to create a resource R1 so that it is publicly accessible from a public network (i.e., the Internet), i.e., permit R1 to be created using a public Internet Protocol (IP) address. When compartment A1 216 becomes associated with security zone-1 202, the security zone policies 208 associated with the security zone-1 202 may prohibit the user from being able to create R1 using a public IP address. As another example, the security zone policies may not allow a user to create/launch a "virtual machine" resource instance if the resource references/is attached to a public subnet resource because the subnet resource may be associated with a security zone policy that prohibits the user from launching the "virtual machine" instance from a subnet resource that uses a public IP address.

In certain implementations, a compartment (e.g., compartment A1 216) may also be hierarchically related to other compartments created within a tenancy. For instance, in the embodiment depicted in FIG. 2, the compartment A1 216 may be hierarchically related (i.e., be a child compartment) to one or more compartments (i.e., parent compartments) created within the tenancy. When a resource (e.g., R1) is added to the compartment A1 216, the resource automatically inherits the compartment policies associated with the compartment in addition to the compartment policies one or more parent compartments associated with the compartment. An exemplary illustration of the inheritance of compartment policies for a compartment is depicted in FIG. 5A.

Figure 3:
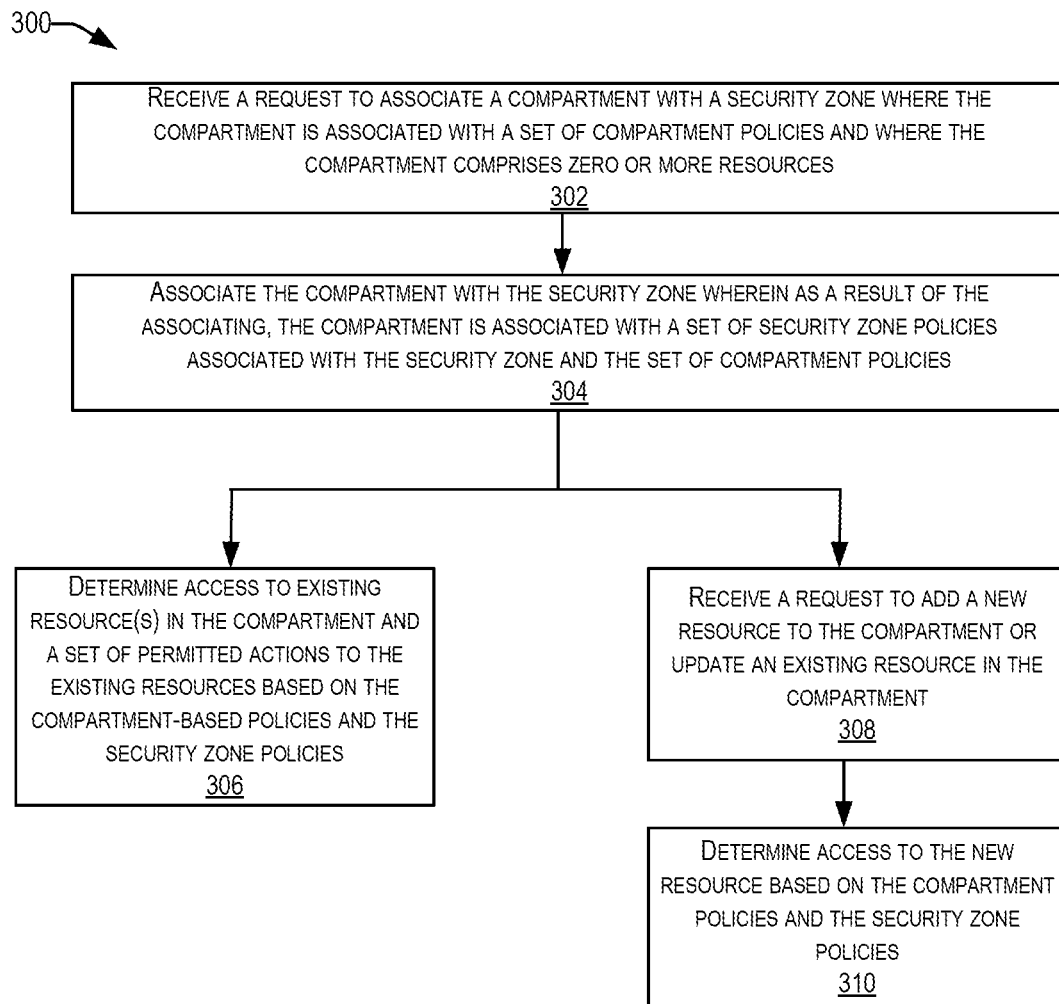
FIG. 3 depicts an example of a process 300 performed by the security zone policy management subsystem 116 in the CSPI shown in FIG. 1, according to certain embodiments.

FIG. 3 depicts an example of a process 300 performed by the security zone policy management subsystem 116 in the CSPI shown in FIG. 1, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel.

The processing depicted in FIG. 3 is initiated at block 302 when the security zone policy management subsystem 116 receives a request to associate a compartment with a security zone. The compartment may be associated with a set of compartment policies and comprise zero or more resources. At block 304, the security zone policy management subsystem 116 associates the compartment with the security zone. As a result of the associating, the compartment becomes associated with the set of security zone policies associated with the security zone and the set of compartment policies.

At block 306, the security zone policy management subsystem 116 determines access to existing resources (if any are present) in the compartment and a set of permitted actions/operations to the existing resources based on the compartment policies and the security zone policies. In certain examples, at block 308, the security zone policy management subsystem 116 may receive a request to add a new resource to the compartment or update an existing resource residing in the compartment. At block 310, the security zone policy management subsystem 116 determines access to the new resource based on the compartment policies and the security zone policies.

Figure 4:
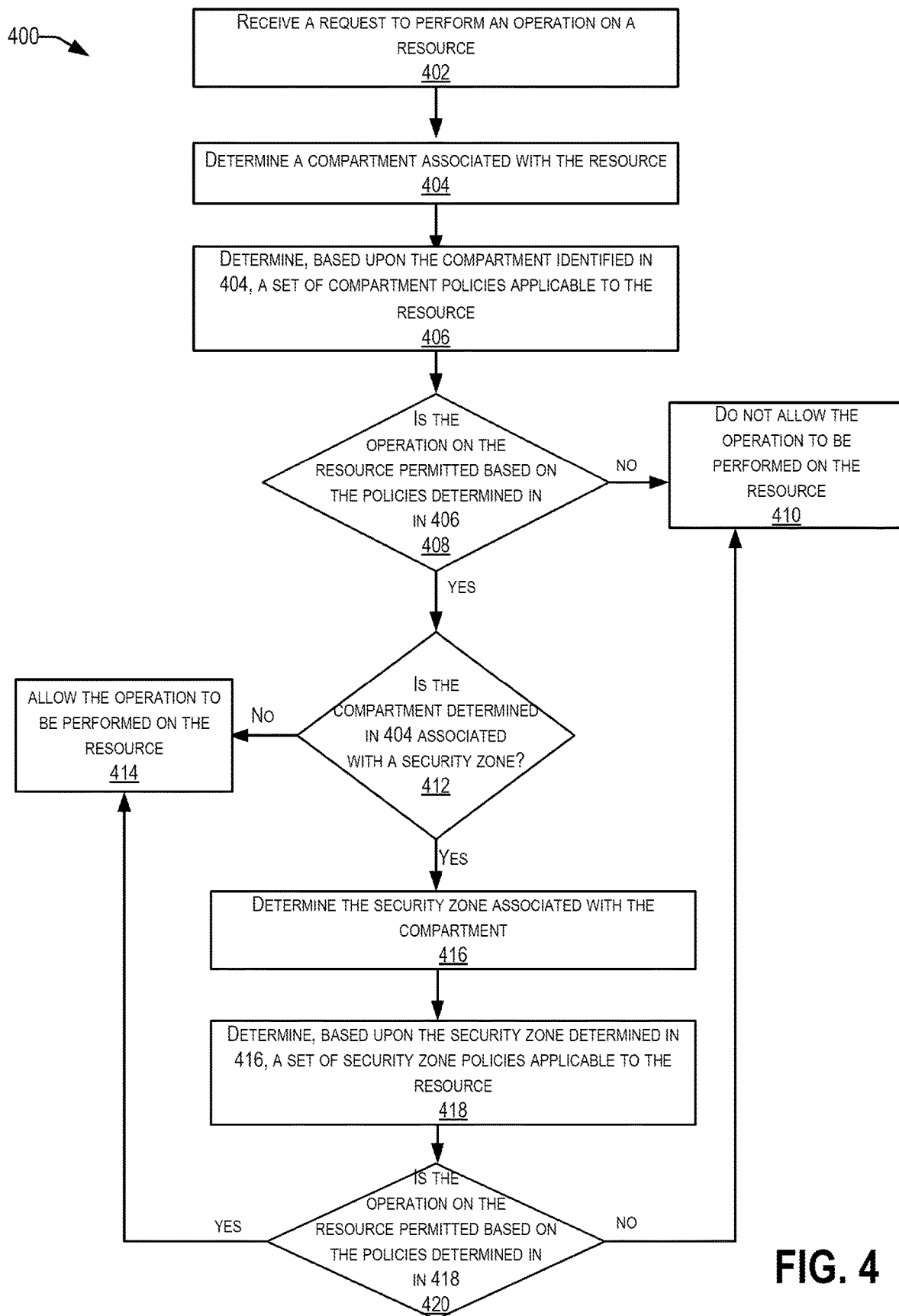
FIG. 4 depicts an example of a process 400 performed by the security zone policy validation subsystem in the CSPI shown in FIG. 1, according to certain embodiments.

FIG. 4 depicts an example of a process 400 performed by the security zone policy validation subsystem in the CSPI shown in FIG. 1, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel.

The processing depicted in FIG. 4 is initiated at block 402 when the security zone policy validation subsystem 118 receives a request to perform an operation on a resource. For instance, the request may identify an operation (e.g., a "launch instance" operation) to be performed on an "instance" (i.e., virtual machine instance) to create a virtual machine instance in the user's tenancy using a public IP address. At block 404, the security zone policy validation subsystem 118 determines a compartment associated with the resource. At block 406, the security zone policy validation subsystem 118 determines, based on the compartment identified in block 404, a set of compartment policies that are applicable to the resource. The compartment policies applicable to the resource may include compartment policies associated with the compartment in addition to the compartment policies of one or more parent compartments that are hierarchically related to the compartment. At block 408, the security zone policy validation subsystem 118 determines if the operation on the resource is permitted based on the compartment policies determined in block 406. For instance, the compartment policies applicable to the resource may permit the user to create the virtual machine instance so that it is publicly accessible from a public network (i.e., the Internet), i.e., permit the virtual machine instance to be created using a public IP address.

If the operation on the resource cannot be performed based on the compartment policies determined in block 406, then at block 410, the security zone policy validation subsystem 118 disallows the operation to be performed on the resource. If the operation on the resource can be performed based on the compartment policies determined in block 406, then, at block 412, the security zone policy validation subsystem 118 determines if the compartment determined in block 404 is associated with a security zone. If the compartment is not associated with a security zone, then at block 414, the security zone policy validation subsystem 118 allows the operation to be performed on the resource. If the compartment is associated with a security zone, at block 416, the security zone policy validation subsystem 118 determines the security zone associated with the compartment. At block 418, the security zone policy validation subsystem 118 determines based on the security zone determined in block 416, the set of security zone policies applicable to the resource. The security zone policies applicable to the resource may include security zone policies associated with the security zone in addition to the security zone policies of one or more parent security zones that are hierarchically related to the security zone. At block 420, the security zone policy validation subsystem 118 determines if the operation on the resource is permitted based on the security zone policies determined in 418. For instance, the security zone policies applicable to the resource may not permit the virtual instance resource to be created using a public IP address.

If the operation on the resource is not allowed based on the security zone policies determined in 418, at block 410, the security zone policy validation subsystem 118 disallows the operation to be performed on the resource. If the operation on the resource is allowed based on the policies determined in 418, at block 414, the security zone policy validation subsystem 118 allows the operation to be performed on the resource. In certain examples, the processing performed at block 414 may include transmitting, by the security zone policy validation subsystem 118, a request to a downstream service in the CSPI for further processing of the request. As a result of the processing performed by the downstream service, the security zone policy validation subsystem 118 may transmit a result to the user that indicates that the operation was successfully able to be performed on the resource.

FIG. 5A is an exemplary illustration of the inheritance of compartment policies by a compartment created by a user of a tenant of the CSPI shown in FIG. 1, according to certain embodiments. In the example depicted in FIG. 5A, compartment C1 502, compartment C2 504 and compartment C3 506 are hierarchically related to one another, where compartment C1 502 is a parent compartment of compartment C2 504 and compartment C2 504 is a parent compartment of compartment C3 506. Compartment C1 502 is associated with a set of compartment policies 508 that allow an operation O1 to be performed on a set of resources residing in the compartment. Compartment C2 504 is associated with a set of compartment policies 510 that allow an operation O2 to be performed on a set of resources residing in the compartment. Because compartment C2 504 is a child compartment of compartment C1 502, it automatically inherits the compartment policies 508 of compartment C1 502. Compartment C3 506 is associated with a set of compartment policies 512 that allows an operation O3 to be performed on a set of resources residing in the compartment. Because, compartment C3 506 is a child compartment of both compartment C2 504 and compartment C1 502, it automatically inherits the compartment policies 510 of compartment C2 504 as well as those of compartment C1 502.

FIG. 5B is an exemplary illustration of the inheritance of security zone policies associated with a security zone by a compartment created by a tenant of the CSPI shown in FIG. 1, according to certain embodiments. The example depicted in FIG. 5B illustrates the compartment C1 502, compartment C2 504 and compartment C3 506 depicted in FIG. 5A along with their associated compartment policies 508, 510 and 512. In certain examples, when a compartment (e.g., compartment C3 506) becomes associated with a security zone (security zone-1 514), the security zone policies 516 associated with the security zone-1 514 are applied to the compartment. Due to the association of the compartment C3 506 with the security zone policies 516, the set of operations (O1, O2, O3) that were originally allowed to be performed on a resource R1 residing in the compartment is now reduced to a subset of operations (O1). Thus, the security zone policies represent an additional layer of security policies that may be enforced on a set of resources residing in the compartment in addition to the compartment policies associated with the compartment. The security zone policies may prohibit an entire set of operations that can be performed on a set of resources residing in a compartment, prohibit a subset of operations or prohibit a specific configuration/version of the operation that can be performed on the set of resources.

Figure 6:
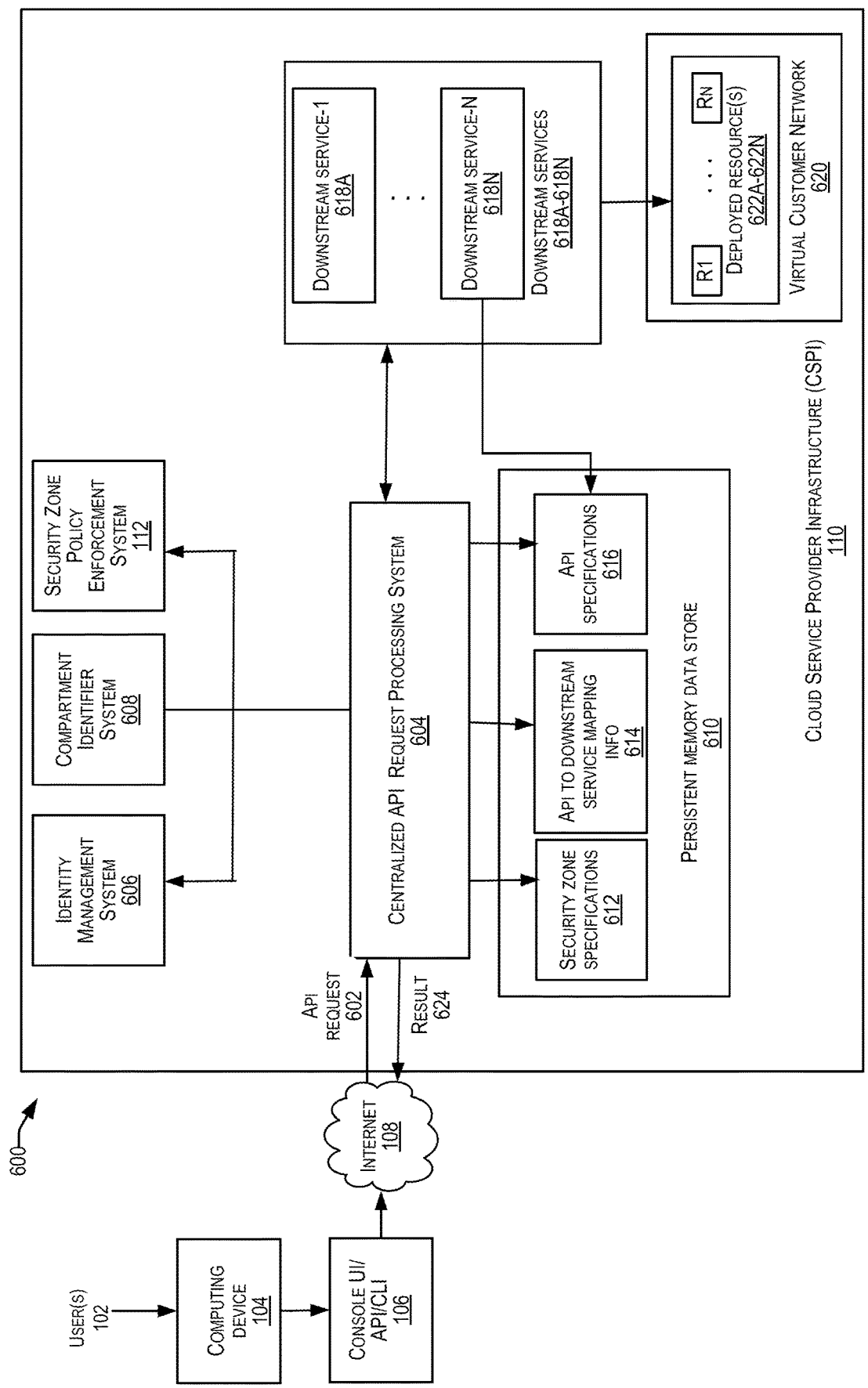
FIG. 6 depicts a high level diagram of a computing environment 600 comprising a cloud service provider infrastructure (CSPI) 110 that includes a centralized API request processing system and a security zone policy enforcement system for providing a secure framework for enabling secure access to various resources managed by the CSPI, according to certain embodiments.

In certain implementations, the security zone policy enforcement system described in FIGS. 1-4, FIG. 5A and FIG. 5B above may cooperate with a centralized request processing system that is configured to provide a centralized point for providing secure resource access to the users of the CSPI. The centralized request processing system may operate in conjunction with the security zone policy enforcement system to provide a centralized robust and secure framework for managing and enforcing security policies related to various resources managed by the CSPI. In certain examples, the processing performed by the centralized request processing system may involve, evaluating compartment policies and security zone policies associated with one or more compartments in which the resources reside in to determine if certain operations can be performed on the resources identified in a request. As a result of the processing, if a policy (i.e., a compartment policy or a security zone policy) is violated, the user is not allowed to execute the operation identified in request and the centralized request processing system transmits information to the user that the user is not allowed to perform the operation. In certain embodiments, the centralized request processing system may be implemented by a centralized Application Programming Interface (API) request processing system in the CSPI 110 as shown in FIG. 6 below. Details related to the implementation and processing performed by the centralized Application Programming Interface (API) request processing system is described below in reference to FIGS. 6-12 and their accompanying description.

Centralized Application Programming Interface (API) Request Processing System in a Cloud Service Provider Infrastructure (CSPI)

FIG. 6 depicts a high level diagram of a computing environment 600 comprising a cloud service provider infrastructure (CSPI) 110 that includes a centralized API request processing system and a security zone policy enforcement system for providing a secure framework for enabling secure access to various resources managed by the CSPI, according to certain embodiments. As previously described, the resources may include, without limitation, compute, networking, object storage, and database resources that are hosted in a distributed environment by the CSPI 110. A user 102 of a tenant or customer of the CSPI 110 can use the resources provided by the CSPI 110 to build their own networks (e.g., VCN 620) and deploy one or more resources 622A-622N, such as compute instances (e.g., virtual machines, bare metal instances) on the VCN 620.

The CSPI infrastructure 110 may be implemented by one or more computing systems that execute computer-readable instructions (e.g., code, program) to implement the secure framework for managing and enforcing security policies related to various resources managed by the CSPI. As depicted in FIG. 6, the CSPI 110 includes various systems and subsystems including a centralized API request processing system 604, an identity management system 606, a compartment identifier system 608 and a security zone policy enforcement system 112. Portions of data or information used by or generated by the centralized API request processing system 604 as part of its processing may be stored in a persistent memory data store 610 and in security zone information (e.g., 120 shown in FIG. 1) by the security zone policy enforcement system 112. The CSPI 110 additionally comprises a set of one or more downstream services 618A-618N that may be communicatively coupled to the centralized API request processing system 604 via one or more communication networks. A user 102 of a customer of the CSPI 110 may utilize the downstream services for provisioning or deploying infrastructure resources in the customer's VCN 620. The systems and subsystems depicted in FIG. 6 may be implemented using software (e.g., code, instructions, program) executed by one or more processing units (e.g., processors, cores) of a computing system, hardware, or combinations thereof. The software may be stored on a non-transitory storage medium (e.g., on a memory device).

The centralized API request processing system 604 may be implemented in various different configurations. In the embodiment depicted in FIG. 6, the centralized API request processing system 604 is implemented on one or more servers in the CSPI 110 and its centralized secure resource access services may be provided to subscribers of cloud services on a subscription basis. Computing environment 600 depicted in FIG. 6 is merely an example and is not intended to unduly limit the scope of claimed embodiments. One of ordinary skill in the art would recognize many possible variations, alternatives, and modifications. For example, in some implementations, the CSPI 110 can be implemented using more or fewer subsystems than those shown in FIG. 1, may combine two or more subsystems, or may have a different configuration or arrangement of subsystems.

As depicted in FIG. 6, a user 102 of the CSPI 110 may interact with the centralized API request processing system 604 using a computing device 104 that is communicatively coupled to the CSPI 110, possibly via one or more communication networks. The computing device may be of various types, including but not limited to, a mobile phone, a tablet, a desktop computer, and the like. A user 102 may represent a customer or a tenant of the CSPI 110 who wishes to utilize the services provided by the centralized API request processing system 604 and the security zone policy enforcement system 112 to securely manage and access their resources within the CSPI. For instance, the user 102 may interact with the centralized API request processing system 604 using a console User Interface (UI), via Application Programming Interfaces (APIs) or via a command line interface (CLI) 106 connected to the user's computing device (e.g., 104) to securely manage and access their resources in the CSPI 110. For instance, the console UI may be a web-based user interface (UI) (or a web based application) provided by the centralized API request processing system 604 to enable users to interact with the centralized API request processing system 604.

In certain embodiments, a user may, via the console UI, via APIs or via the CLI 106 connected to the user's computing device 104 send an API request 602 to the centralized API request processing system 604. The API request 602 may identify an operation to be performed on a resource managed by the CSPI 110. By way of example, an API request may identify a "launch instance" operation to be performed on an "instance" resource (e.g., a virtual machine instance) managed by the CSPI. Other examples of API requests may include, for instance, a "create subnet," operation for creating a "subnet" resource, a "create block storage volume" operation for creating a "block storage volume" resource and the like. Upon receiving the request, the centralized API request processing system 604 performs processing to determine if the operation can be securely performed on the resource identified in the API request without violating any policies (e.g., compartment policies as well as security zone policies) that are relevant to the resource identified in the request. Based on the processing, the centralized API request processing system 604 returns result(s) 624 back to the requesting computer device 104. The result(s) 134 may include information that the operation was successfully able to be performed on the resource, a message that the operation could not be performed because of a policy violation and possibly other information included in the results. The result(s) 624 may be output to a user, for example, via the UI 106 connected to the user's device 104.

Portions of data or information used by or generated by the centralized API request processing system 602 as part of its processing may be stored in a persistent memory data store 610. In certain examples, the information stored in the persistent memory data store may include security zone specifications 612, API to downstream service mapping information 614 and API specifications 616. The security zone specifications 612 may store information related to resources identified in an API request, the downstream service(s) identified for performing the operations identified on the resources in the API request, context information required to evaluate the API request and so on. The API to downstream service mapping information 614 may store information related to how an API request maps to a downstream service in the CSPI and the API specifications 616 comprise information related to a set of APIs utilized by the downstream services.

The security zone specifications 612, API to downstream service mapping information 614 and API specifications 616 may be used by the centralized API request processing system 602 as part of its processing to evaluate whether an operation on a resource identified in an API request is permitted to be performed by a user. In certain examples, the information 612, 614 and 616 may be uploaded by a user (e.g., an administrator) of the centralized API request processing system 604 to the persistent memory data store 610 as part of the centralized secure resource access services provided by the centralized API request processing system 604 to the users of the CSPI 110.

In certain approaches, in addition to utilising the information 612, 614, or 616 stored in the persistent memory data store 610, the centralized API request processing system 602 may also interact with one or more systems such the identity management system 606, the compartment identifier system 608 and the security zone policy enforcement system 112 to obtain the required information for evaluating whether an operation identified in an API request is allowed to be performed by a user. Additional details of the processing performed by the centralized API request processing system 604 and its interactions with the various systems 606, 608 and 112 to provide secure access to resources within the CSPI 110 are described below with respect to the flowchart depicted in FIG. 7 and the accompanying description.

Figure 7:
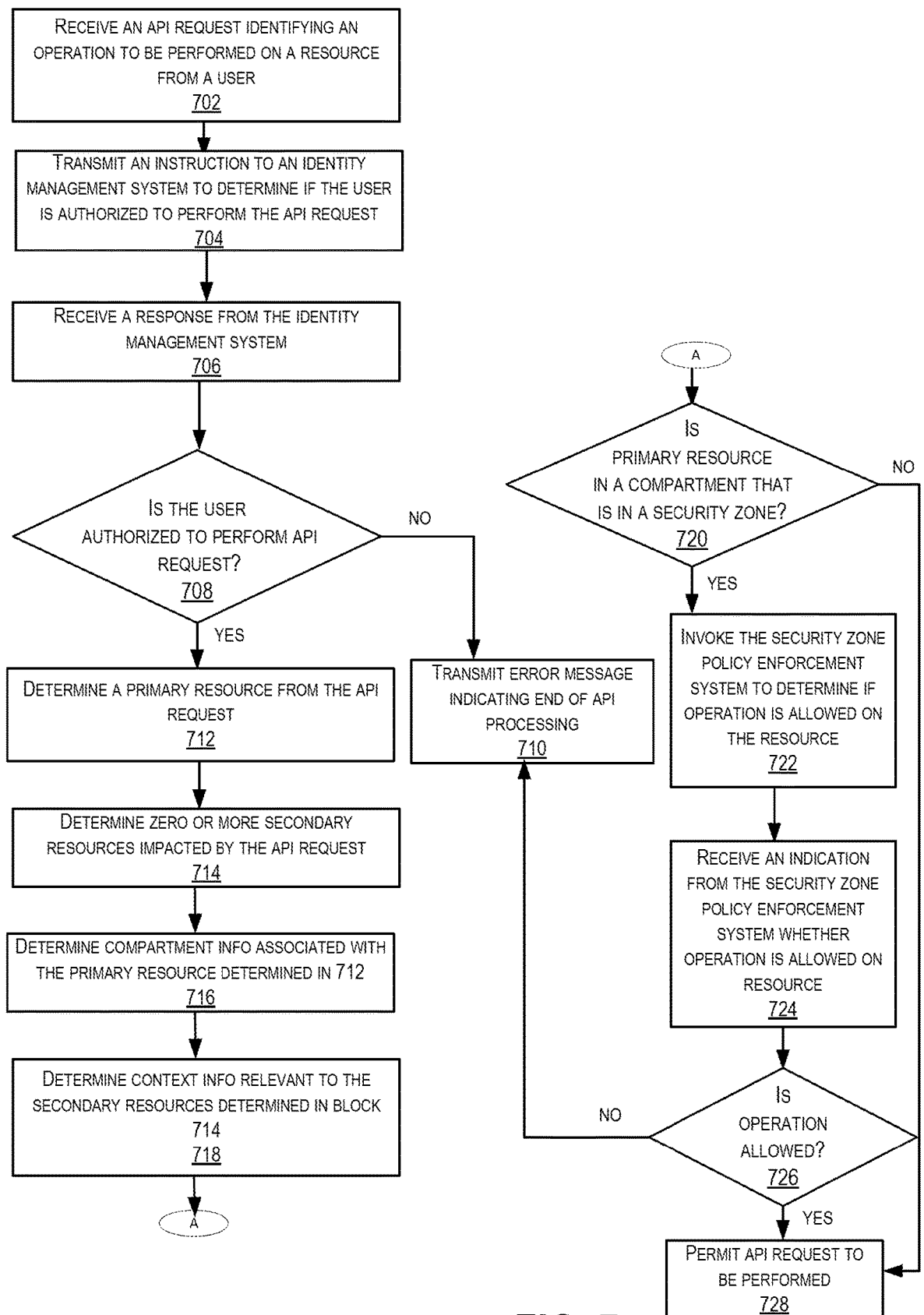
FIG. 7 depicts an example of a process 700 performed by the centralized API request processing system for providing users secure access to various resources managed by the CSPI, according to certain embodiments.

FIG. 7 depicts an example of a process 700 performed by the centralized API request processing system for providing users secure access to various resources managed by the CSPI, according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 700 presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 6, the processing depicted in FIG. 7 may be performed by the centralized API request processing system 604.

In the embodiment depicted in FIG. 7, processing is initiated when, in block 702, the centralized API request processing system 604 receives an API request (e.g., 602) from a user. The API request may identify an operation to be performed on a resource managed by the CSPI. By way of example, the API request may identify a "launch instance" operation to be performed on an "instance" resource (e.g., a virtual machine instance) to create/launch a virtual machine instance in the user's VCN 620 in the CSPI 110.

At block 704, the centralized API request processing system 604 transmits an instruction (e.g., an API authorization request) to the identity management system 606 to determine if the user is authorized to perform/execute the API request received in block 702. The processing performed by the identity management system 704 may include authenticating the user (e.g., based on the user's username and password) and upon successfully authenticating the user, determining if the user is authorized to perform the operation identified in the API request. For instance, the identity management system 704 may utilize IAM policies defined by the system to determine if the user is authorized to perform the operation identified in the API request At block 706, the centralized API request processing system 604 receives a response from the identity management system 606 based on the processing performed by the identity management system 606.

At block 708, the centralized API request processing system 604 determines whether the identity management system 606 has authorized the user to execute the operation identified in the API request. If the user is not authorized to execute the operation, at block 710, the centralized API request processing system 604 transmits an error message to the user that indicates the end of the processing of the API request.

If the identity management system 606 has authorized the user to execute the operation identified in the API request, at block 712, the centralized API request processing system 604 determines, from the API request, (a) a "primary resource," which includes the resource named in the API request itself. At block 714, the centralized API request processing system 604 determines, from the API request, zero or more "secondary" resources or "associate" resources, which include resources that are associated with the primary resource. The associate resources may not be identified in the request itself but include resources that are impacted by the API request. By way of example, a primary resource in an API request that performs a "launch instance" operation may represent a "compute" resource instance and an associate resource may be a "boot volume," an "image," or a "subnet" resource that is used to launch the primary resource (i.e., the compute instance). In alternate approaches, both the primary and secondary resources may be included in the API request.

In certain examples, the centralized API request processing system 604 may determine the secondary resources impacted by the API request in block 714 from the API specifications information 616 stored in the persistent memory data store 610. For instance, from the API specifications information 616, the centralized API request processing system 604 may obtain the API specification corresponding to the API request received in block 702. The API specification may identify the primary resource as well as secondary resources impacted by the API request, along with the operation(s) to be performed on the primary resource. In other approaches, the centralized API request processing system 604 may determine the primary resources and associate resources impacted by the API request in block 712 based on accessing the security zone specification corresponding to API request from the security zone specifications 612 stored in the data store 610. Examples of security zone specifications corresponding to API requests are described in detail in FIGS. 10-12 below.

At block 716, the centralized API request processing system 604 determines compartment information for the primary resource determined in block 712. The compartment information may include a compartment identifier of the compartment that the resource resides in and compartment policies applicable to the resource. The compartment policies applicable to the resource may include compartment policies associated with the compartment in addition to the compartment policies of one or more parent compartments that are hierarchically related to the compartment. In certain instances, the centralized API request processing system 604 may transmit an instruction to the compartment identifier system 608 to obtain the compartment information. In other instances, the centralized API request processing system 604 may obtain the compartment information from the security zone specification associated with the API request.

At block 718, the centralized API request processing system 604 determines context information relevant to the secondary resources determined in block 714. The context information may include compartment information associated with the secondary resources, a resource identifier associated with the secondary resources, the downstream service responsible for executing the API request and the like. For instance, for an API request that identifies a "launch instance" operation, a primary resource may be determined to be an "instance" resource and the secondary resource may be determined to be a "boot volume" resource used to launch the primary resource. The context information may include a boot volume resource identifier and a downstream service (e.g., block storage service) for executing the "launch instance" operation identified in the API request.

Various approaches may be utilized by the centralized API request processing system 604 to determine/obtain the context information for the secondary resources. For example, in one approach, the centralized API request processing system 604 may utilize the security zone specifications information 612 stored in the persistent memory data store 610 to determine the context information applicable to the secondary resources. In another approach, the centralized API request processing system 604 may determine or obtain the context information applicable to the resources directly from the API to downstream service mapping information 614 or from the downstream service responsible for executing the API request.

The processing then proceeds to block 720 where the centralized API request processing system 604 determines if the primary resource resides in a compartment that is associated with a security zone. Details regarding the association of a compartment to a security zone is described in detail in FIG. 2 and its accompanying description. If the primary resource does not reside in a compartment that is associated with a security zone, then the processing proceeds to block 728 to permit the user to perform the API request.

If the primary resource resides in a compartment that is associated with a security zone, then at block 722, the centralized API request processing system 604 invokes the security zone policy enforcement system 112 to determine of the operation is allowed to be performed on the resource.

At block 724, based on the processing performed by the security zone policy enforcement system 112, the centralized API request processing system 604 receives an indication from the security zone policy enforcement system 112 whether the operation on the resource is allowed. For instance, the security zone policy enforcement system 112 may determine that the operation on the resource is permitted based on evaluating the security zone policies associated with the security zone determined in block 720. Additional details of the processing performed by the security zone policy enforcement system 112 to determine whether the operation on the resource is allowed is described in FIG. 8 and its accompanying description.

At block 726, if it is determined that the operation is not allowed, at block 710, the centralized API request processing system 604 transmits an error message to the user that indicates the end of the processing of the API request. At block 726, if it is determined that the operation is allowed, at block 728, the centralized API request processing system 604 permits the API request to be performed In certain examples, the processing depicted in FIG. 7 may involve the identification of multiple primary resources (at block 712). In this case, the evaluation performed by the security zone policy enforcement system 112 (at block 724) may involve identifying the compartments associated with all the identified primary resources, evaluating the security zone policies of the identified compartments and ensuring that the actions are permitted according to the security zone policies of the identified compartments.

Figure 8:
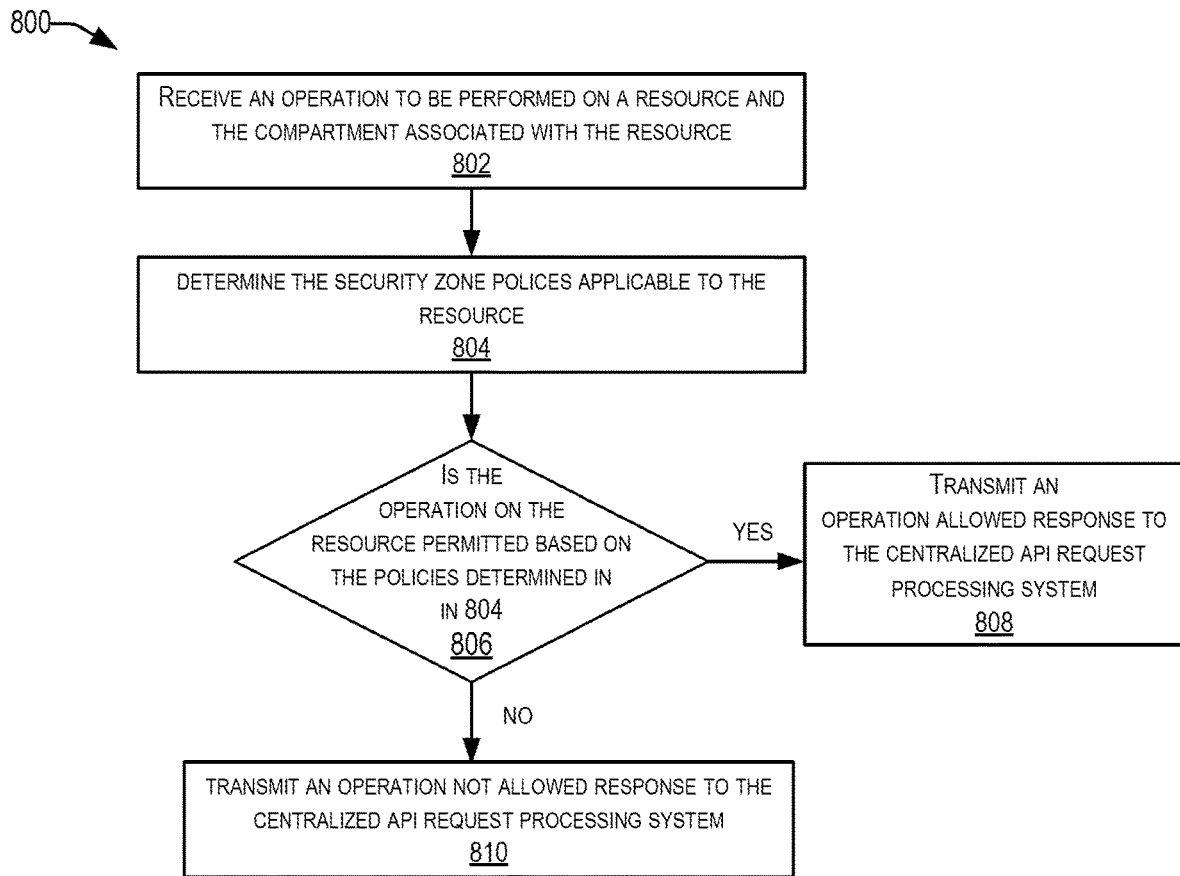
FIG. 8 depicts an example of a process 800 of the processing performed by the security zone policy enforcement system 112 to determine whether an operation is allowed to be performed on a resource based upon evaluating a set of security zone policies associated with the resource, according to certain embodiments.

FIG. 8 depicts an example of a process 800 of the processing performed by the security zone policy enforcement system 112 to determine whether an operation is allowed to be performed on a resource based upon evaluating a set of security zone policies associated with the resource, according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 800 presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 8 depicts additional details of the processing performed by the security zone policy enforcement system 112 in block 722 of FIG. 7.

In certain embodiments, the processing depicted in FIG. 8 is initiated at block 802 when the security zone policy enforcement system 112 receives an operation to be performed on a resource and the compartment (i.e., the compartment id) associated with the resource. At block 804, the security zone policy enforcement system 112 determines the security zone policies applicable to the resource. The security zone policies applicable to the resource may include security zone policies associated with the security zone in addition to the security zone policies of one or more parent security zones that are hierarchically related to the security zone. For instance, the security zone policy enforcement system 112 may obtain information regarding the security zone policies from the security zone information (e.g., 120 shown in FIG. 1) managed by the security zone policy enforcement system 112.

At block 806, the security zone policy enforcement system 112 performs an evaluation to determine if the operation is permitted on the resource based on the polices determined in block 804. If the operation is allowed, then at block 808, the security zone policy enforcement system 112 transmits an "operation allowed" response to the centralized API request processing system. If the operation is not allowed, at block 810, the security zone policy enforcement system 112 transmits an "operation not allowed" response to the centralized API request processing system.

Figure 9:
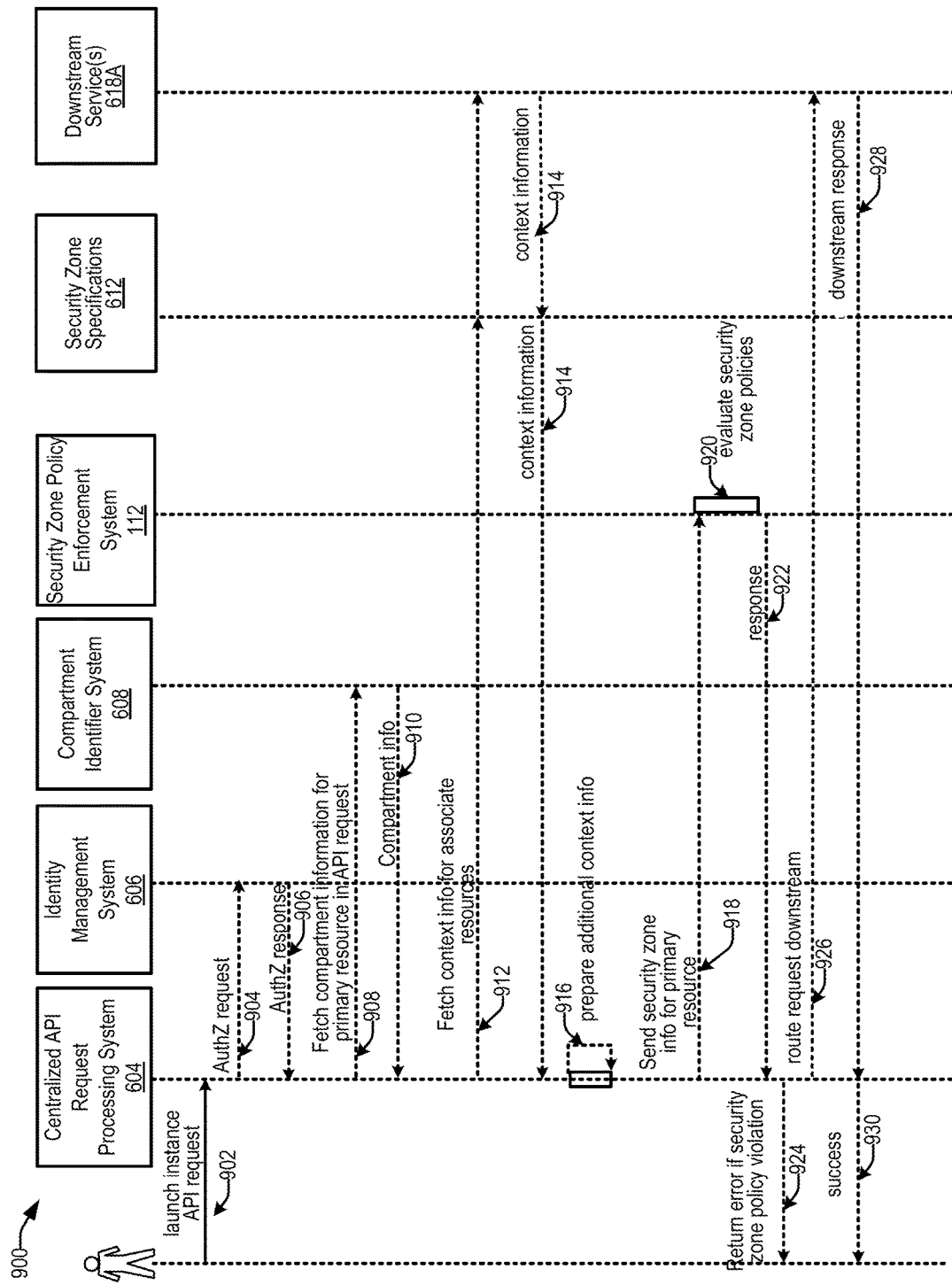
FIG. 9 is a sequence diagram illustrating the interactions between the centralized API request processing system and one or more other systems shown in FIG. 6 for providing a user secure access to various resources managed by the CSPI, according to certain embodiments.

FIG. 9 is a sequence diagram illustrating the interactions between the centralized API request processing system and one or more other systems shown in FIG. 6 for providing a user secure access to various resources managed by the CSPI, according to certain embodiments. The processing depicted in FIG. 9 is initiated when a user sends an API request 902 to the centralized API request processing system 604. By way of example, the API request may identify an operation (e.g., "launch instance") to be performed on a "virtual machine" resource instance identified in the API request. Upon receiving the request, the centralized API request processing system 604 transmits an authorization request (AuthZ request) 904 to the identity management system 606 to determine if the user is authorized to perform the API request. At operation 906, the identity management system 606 returns a response (AuthZ response) to the centralized API request processing system 604 indicative of whether the user is authorized to execute the API request.

If the user is authorized to execute the API request, at operation 908, the centralized API request processing system 604 transmits an instruction to the compartment identifier system 608 to obtain/fetch compartment information for the primary resource identified in the API request. The "primary resource" may include a resource identified in the API request itself. For instance, a "compute" resource instance may be determined to be a primary resource in an API request that performs a "launch instance" operation. As previously described, the compartment information may include a compartment identifier and compartment policies applicable to the resource. At operation 910, the centralized API request processing system 604 receives the compartment information from the compartment identifier system 608.

At operation 912, the centralized API request processing system 604 transmits a request to the downstream service responsible for executing the API request to obtain context information relevant to the secondary resources impacted by the API request. The "secondary" resources or "associate" resources may include resources that are associated with the primary resource. The associate resources may not be identified in the request itself but include resources that are impacted by the API request. By way of example, a primary resource in an API request that performs a "launch instance" operation may represent a "compute" resource instance and an associate/secondary resource may be a "boot volume," an "image," or a "subnet" resource that is used to launch the primary resource (i.e., the compute instance). For example, based on the example of the "launch instance" API request, a boot volume identifier (bootVolumeId) may be relevant input (context information) required for launching an "instance" primary resource from a secondary (associate) "boot volume" resource. In certain examples, the centralized API request processing system 604 may fetch the context information from a downstream service (e.g., a compute service 618A) that is configured to execute the operation identified in the API request. In other examples, the centralized API request processing system 604 may fetch the context information from the security zone specification 612 related to the API request stored in the persistent memory data store 610. Additional details describing the manner in which context information relevant to an API request may be specified and/or obtained is described in relation to the security zone specifications described in FIGS. 10-12.

At operation 914, the centralized API request processing system 604 receives the required context information for processing the API request. In certain examples, at block 916, the centralized API request processing system 604 may optionally prepare additional context variables based on the primary and associate resources identified in the API request. The additional context variables may include for instance, obtaining the current state of the resources identified in the API request and so on. For instance, for the example of attaching a boot volume to a compute instance, additional context variables may include obtaining information related to the encryption key to be used with the block volume.

In certain examples, at 918, the centralized API request processing system 604 determines if the primary resource resides in a compartment that is associated with a security zone and if so transmits the security zone info (e.g., a security zone id) to the security zone policy enforcement system 112. At operation 920, the security zone policy enforcement system 112 performs processing to determine if the operation on the resource is permitted based on evaluating the security zone policies associated with the security zone (and any security zone policies associated with security zones that are hierarchically related to the security zone). Based on the processing, at operation 922, the security zone policy enforcement system 122 transmits a response to the centralized API request processing system 604.

If the response indicates that the operation is allowed, at operation 926, the centralized API request processing system forwards (routes) the API request to the identified downstream service 618A (e.g., compute service) for further processing. As a result of the successful processing of the API request, at operation 928, the downstream service 618 transmits a downstream response to the centralized API request processing system 604 that the operation was successfully executed. At operation 930, the centralized API request processing system 604 transmits an indication to the user that the API request was successfully executed. If the response indicates that the API request is not allowed, at operation 924, the centralized API request processing system 604 transmits a message indicating a policy violation error to the user and ends processing of the API request for the user.

FIG. 10 is an example of a security zone specification corresponding to an API request that identifies an operation for launching a compute instance resource using a compute service in the CSPI shown in FIG. 6, according to certain embodiments. In the depicted example, the security zone specification for a "launch instance" API request identifies an operation (i.e., "LaunchInstance") to be performed on a compute instance resource, the downstream service ("compute service") that executes the operation, a primary resource ("instance") identified in the API request and a set of associate resources ("boot volume," "image," and "subnet") associated with the primary resource. As depicted in FIG. 10, in one example, an "associationPredicate" parameter in the security zone specification may be used to identify that a resource is an associate resource. For instance, when launching a primary "instance" resource from a secondary "boot volume" resource, the boot volume resource is considered to be an associate resource, when launching the "instance" resource from an "image", the image resource is considered as an associate resource, when launching the "instance" resource from a "subnet", the subnet resource is considered as an associate resource and so on.

The security zone specification additionally includes a "contextFetchExpression" parameter configured to fetch context information for the associate resources associated with the primary resource. For instance, a boot volume identifier (bootVolumeId) may be relevant input (context) required for launching an instance from a "boot volume," an image identifier (imageId) may be relevant input (context) required for launching the instance from an "image," and a subnet identifier (subnetId) may be relevant input (context) required for launching the instance from a "subnet." In certain examples, the security zone specification additionally includes a "compartmentIdExpression" parameter that may be used to obtain the compartment identifier associated with the primary resources and the associate resources identified in the API request.

FIG. 11 is an example of a security zone specification corresponding to an API request that identifies operations for attaching a volume to an instance, attaching a boot volume to an instance and changing the compartment identifier for an instance using a compute service in the CSPI, according to certain embodiments. In the depicted example, the security zone specification for an "attach volume" API request identifies an operation (i.e., "AttachVolume") to be performed on a compute instance resource, the downstream service ("compute service") that executes the operation, a primary resource ("instance") identified in the API request and an associate resource ("volume") associated with the primary resource. The security zone specification for the "attach volume" API request also identifies context information (a volume id) required for attaching a volume to an instance and the compartment identifier associated with the primary resource and the associate resource identified in the API request.

Similarly, the security zone specification for the "attach boot volume" API request identifies an operation ("AttachBootVolume") to be performed on the instance resource, the downstream service ("compute service") that executes the operation, a primary resource ("instance") identified in the API request and an associate resource ("bootvolume") associated with the primary resource. The security zone specification for the "attach boot volume" API request also identifies context information (boot volume id) required for attaching a volume to an instance and the compartment identifier associated with the primary resource and the associate resource identified in the API request. The security zone specification for the "change instance compartment" API request identifies the operation ("ChangeInstanceCompartment") to be performed on the instance resource, the downstream service ("compute service") that executes the operation and a primary resource ("instance") identified in API request. The security zone specification for the "change instance compartment" API request also identifies context information (resource id) required for changing the compartment of the instance and the compartment identifier associated with the primary resource and identified in the API request.

FIG. 12 is an example of a security zone specification corresponding to an API request that identifies operations for creating a subnet, creating an internet gateway, changing the compartment identifier for a subnet and changing the compartment identifier for the internet gateway using a Virtual Cloud Network service in the CSPI, according to certain embodiments. In the depicted example, the security zone specification for a "create subnet" API request identifies the operation ("Create Subnet") to be performed on a subnet resource, the downstream service ("virtual network service") that executes the operation and a primary resource ("subnet") identified in the API request. The security zone specification for the "create subnet" API request also identifies context information required for creating a subnet and the compartment identifier associated with the primary resource. For this example, the context information comprises information about the IP address of the subnet to determine if the create subnet operation in the API request is using a public IP for creating a subnet.

Similarly, the security zone specification for the "create internet gateway" API request identifies the operation ("CreateInternetGateway") to be performed on an internet gateway resource, the downstream service ("virtual network service") that executes the operation and a primary resource ("internet gateway") identified in the API request. The security zone specification for the "create internet gateway" API request also identifies the compartment identifier associated with the primary resource identified in the API request. The security zone specification for the "change subnet compartment" API request identifies the operation ("Change SubnetCompartment") to be performed on a subnet resource, the downstream service ("virtual network service") that executes the operation, a primary resource ("subnet") identified in the API request and the compartment identifier associated with the primary resource. The security zone specification for the "change internet gateway compartment" API request identifies the operation ("ChangeInternetGatewayCompartment") to be performed on an internet gateway resource, the downstream service ("virtual network service") that executes the operation, a primary resource ("internet gateway") identified in the API request and the compartment identifier associated with the primary resource.

The cloud-based security solution implemented by the disclosed security zone policy enforcement system provides users of an enterprise with a robust secure framework for securely configuring, accessing, and managing their resources in the cloud. As described above, in certain embodiments, the security zone policy enforcement system operates in conjunction with a centralized request processing system for managing and enforcing security policies related to various resources managed by the CSPI. The cloud-based security solution described in the present disclosure provides several technical advancements and/or improvements over conventional cloud-based security services. The disclosed secure framework comprises a set of security zones and security zone policies that can be enforced on a set of resources in the cloud that are accessed by users of an enterprise. The access to the set of resources is governed by the set of security zone policies and are not tied to the identity of a user accessing the resources. Thus, a user who is permitted by an IAM policy to access a certain resource (and/or to perform operations on the resource) may be denied access by the disclosed security solution if the set of security zone policies associated with the resource are violated. The security zone policies are based on "deny semantics" that aim at disallowing certain actions or operations to be performed on a set of resources by any user of the enterprise. This is in contrast to the traditional "allow semantics" employed by existing IAM authorization policies that may allow a particular user to perform a certain action on a resource based on the role/identity of the user within the enterprise.

Example Architectures

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
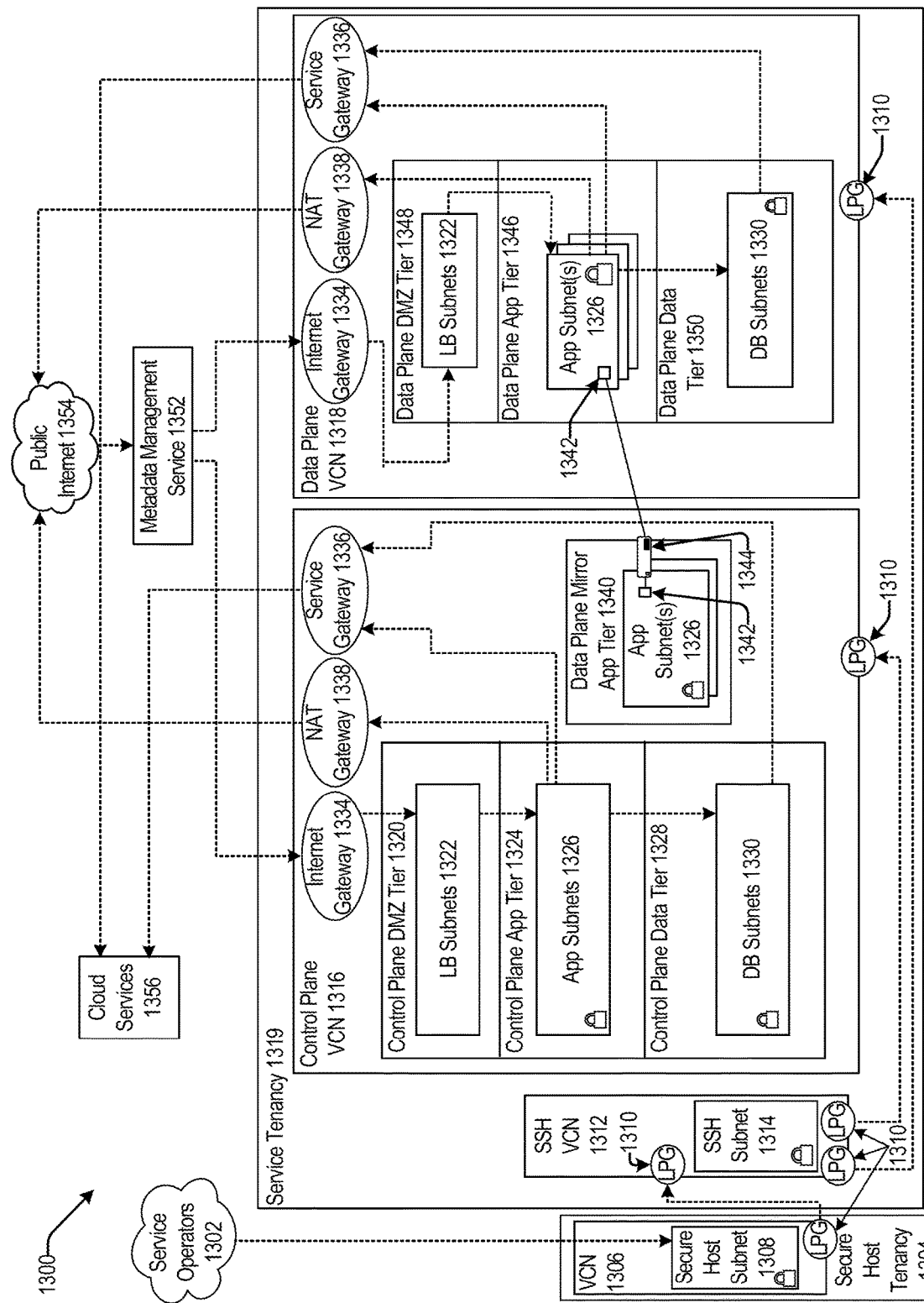
FIG. 13 is a block diagram 1300 illustrating an example pattern of an IaaS architecture, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
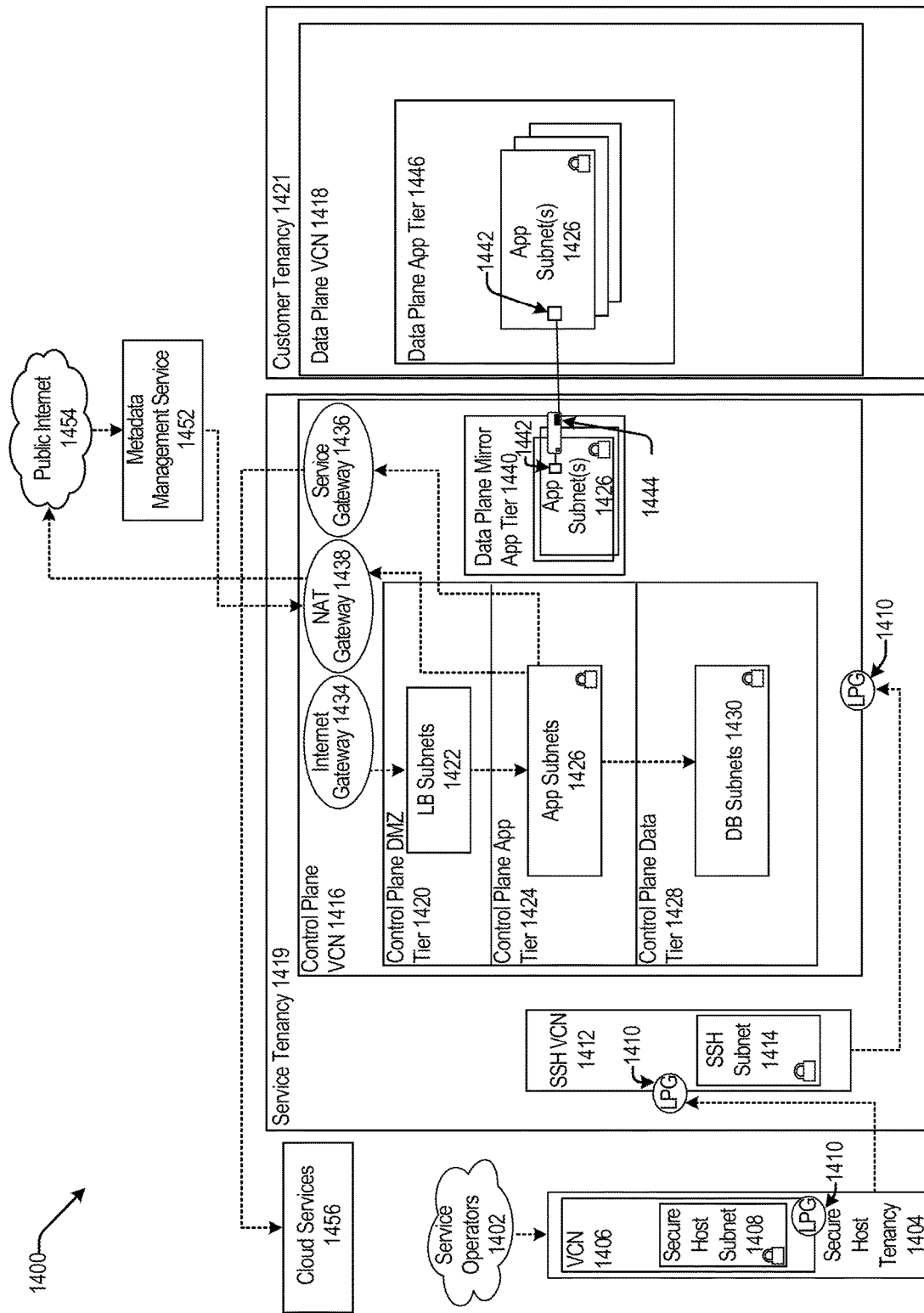
FIG. 14 is a block diagram 1400 illustrating another example pattern of an IaaS architecture, according to at least one embodiment.

FIG. 14 is a block diagram 1400 illustrating another example pattern of an IaaS architecture, according to at least one embodiment. Service operators 1402 (e.g. service operators 1302 of FIG. 13) can be communicatively coupled to a secure host tenancy 1404 (e.g. the secure host tenancy 1304 of FIG. 13) that can include a virtual cloud network (VCN) 1406 (e.g. the VCN 1306 of FIG. 13) and a secure host subnet 1408 (e.g. the secure host subnet 1308 of FIG. 13). The VCN 1406 can include a local peering gateway (LPG) 1410 (e.g. the LPG 1310 of FIG. 13) that can be communicatively coupled to a secure shell (SSH) VCN 1412 (e.g. the SSH VCN 1312 of FIG. 13) via an LPG 1310 contained in the SSH VCN 1412. The SSH VCN 1412 can include an SSH subnet 1414 (e.g. the SSH subnet 1314 of FIG. 13), and the SSH VCN 1412 can be communicatively coupled to a control plane VCN 1416 (e.g. the control plane VCN 1316 of FIG. 13) via an LPG 1410 contained in the control plane VCN 1416. The control plane VCN 1416 can be contained in a service tenancy 1419 (e.g. the service tenancy 1319 of FIG. 13), and the data plane VCN 1418 (e.g. the data plane VCN 1318 of FIG. 13) can be contained in a customer tenancy 1421 that may be owned or operated by users, or customers, of the system.

The control plane VCN 1416 can include a control plane DMZ tier 1420 (e.g. the control plane DMZ tier 1320 of FIG. 13) that can include LB subnet(s) 1422 (e.g. LB subnet(s) 1322 of FIG. 13), a control plane app tier 1424 (e.g. the control plane app tier 1324 of FIG. 13) that can include app subnet(s) 1426 (e.g. app subnet(s) 1326 of FIG. 13), a control plane data tier 1428 (e.g. the control plane data tier 1328 of FIG. 13) that can include database (DB) subnet(s) 1430 (e.g. similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g. the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g. the service gateway of FIG. 13) and a network address translation (NAT) gateway 1438 (e.g. the NAT gateway 1338 of FIG. 13). The control plane VCN 1416 can include the service gateway 1436 and the NAT gateway 1438.

The control plane VCN 1416 can include a data plane mirror app tier 1440 (e.g. the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g. the VNIC of 1342) that can execute a compute instance 1444 (e.g. similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g. the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g. the metadata management service 1352 of FIG. 13) that can be communicatively coupled to public Internet 1454 (e.g. public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g. cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
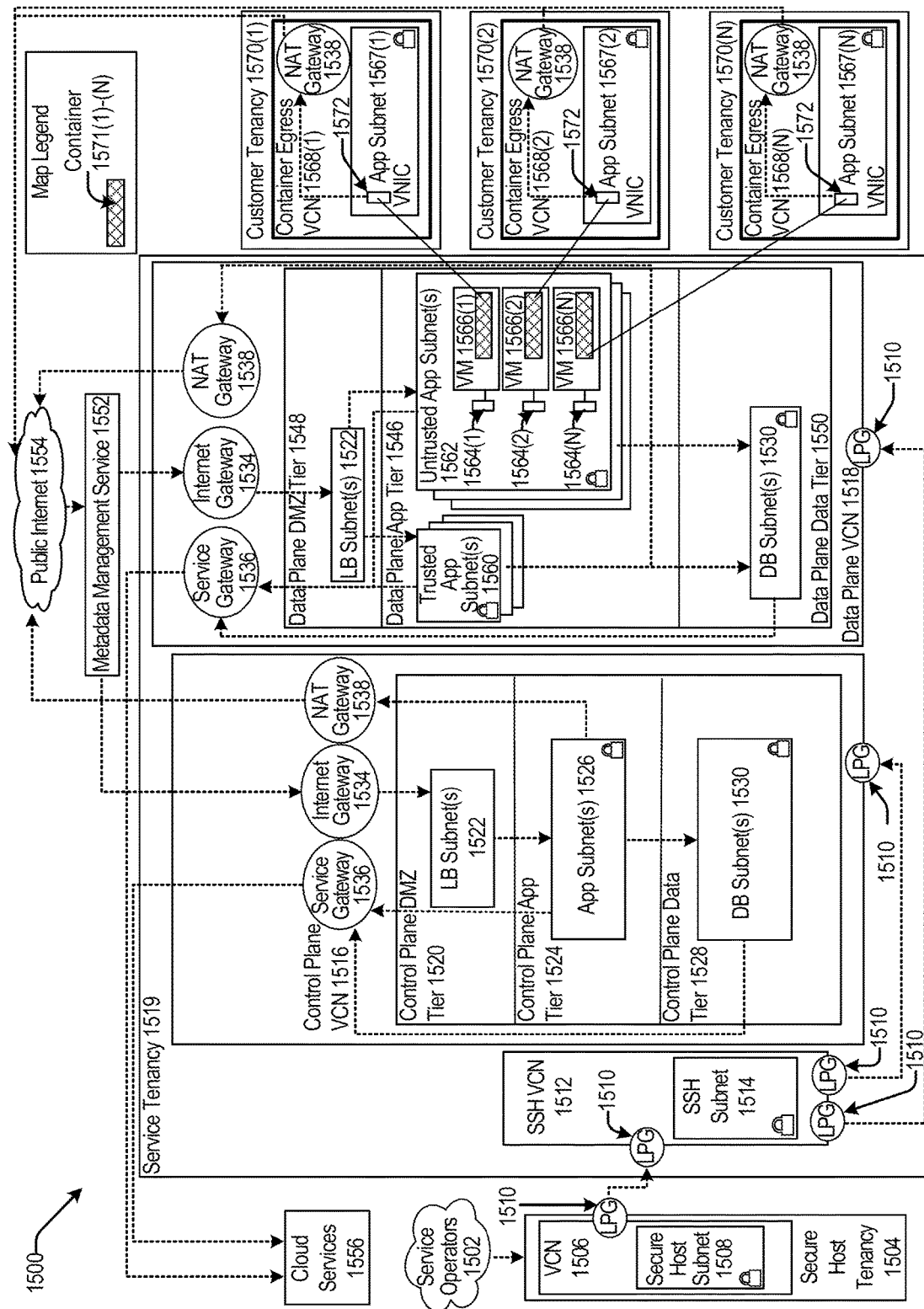
FIG. 15 is a block diagram 1500 illustrating another example pattern of an IaaS architecture, according to at least one embodiment.

FIG. 15 is a block diagram 1500 illustrating another example pattern of an IaaS architecture, according to at least one embodiment. Service operators 1502 (e.g. service operators 1302 of FIG. 13) can be communicatively coupled to a secure host tenancy 1504 (e.g. the secure host tenancy 1304 of FIG. 13) that can include a virtual cloud network (VCN) 1506 (e.g. the VCN 1306 of FIG. 13) and a secure host subnet 1508 (e.g. the secure host subnet 1308 of FIG. 13). The VCN 1506 can include an LPG 1510 (e.g. the LPG 1310 of FIG. 13) that can be communicatively coupled to an SSH VCN 1512 (e.g. the SSH VCN 1312 of FIG. 13) via an LPG 1510 contained in the SSH VCN 1512. The SSH VCN 1512 can include an SSH subnet 1514 (e.g. the SSH subnet 1314 of FIG. 13), and the SSH VCN 1512 can be communicatively coupled to a control plane VCN 1516 (e.g. the control plane VCN 1316 of FIG. 13) via an LPG 1510 contained in the control plane VCN 1516 and to a data plane VCN 1518 (e.g. the data plane 1318 of FIG. 13) via an LPG 1510 contained in the data plane VCN 1518. The control plane VCN 1516 and the data plane VCN 1518 can be contained in a service tenancy 1519 (e.g. the service tenancy 1319 of FIG. 13).

The control plane VCN 1516 can include a control plane DMZ tier 1520 (e.g. the control plane DMZ tier 1320 of FIG. 13) that can include load balancer (LB) subnet(s) 1522 (e.g. LB subnet(s) 1322 of FIG. 13), a control plane app tier 1524 (e.g. the control plane app tier 1324 of FIG. 13) that can include app subnet(s) 1526 (e.g. similar to app subnet(s) 1326 of FIG. 13), a control plane data tier 1528 (e.g. the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 13) and a network address translation (NAT) gateway 1538 (e.g. the NAT gateway 1338 of FIG. 13). The control plane VCN 1516 can include the service gateway 1536 and the NAT gateway 1538.

The data plane VCN 1518 can include a data plane app tier 1546 (e.g. the data plane app tier 1346 of FIG. 13), a data plane DMZ tier 1548 (e.g. the data plane DMZ tier 1348 of FIG. 13), and a data plane data tier 1550 (e.g. the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g. public Internet 1354 of FIG. 13).

The Internet gateway 1534 contained in the control plane VCN 1516 and contained in the data plane VCN 1518 can be communicatively coupled to a metadata management service 1552 (e.g. the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
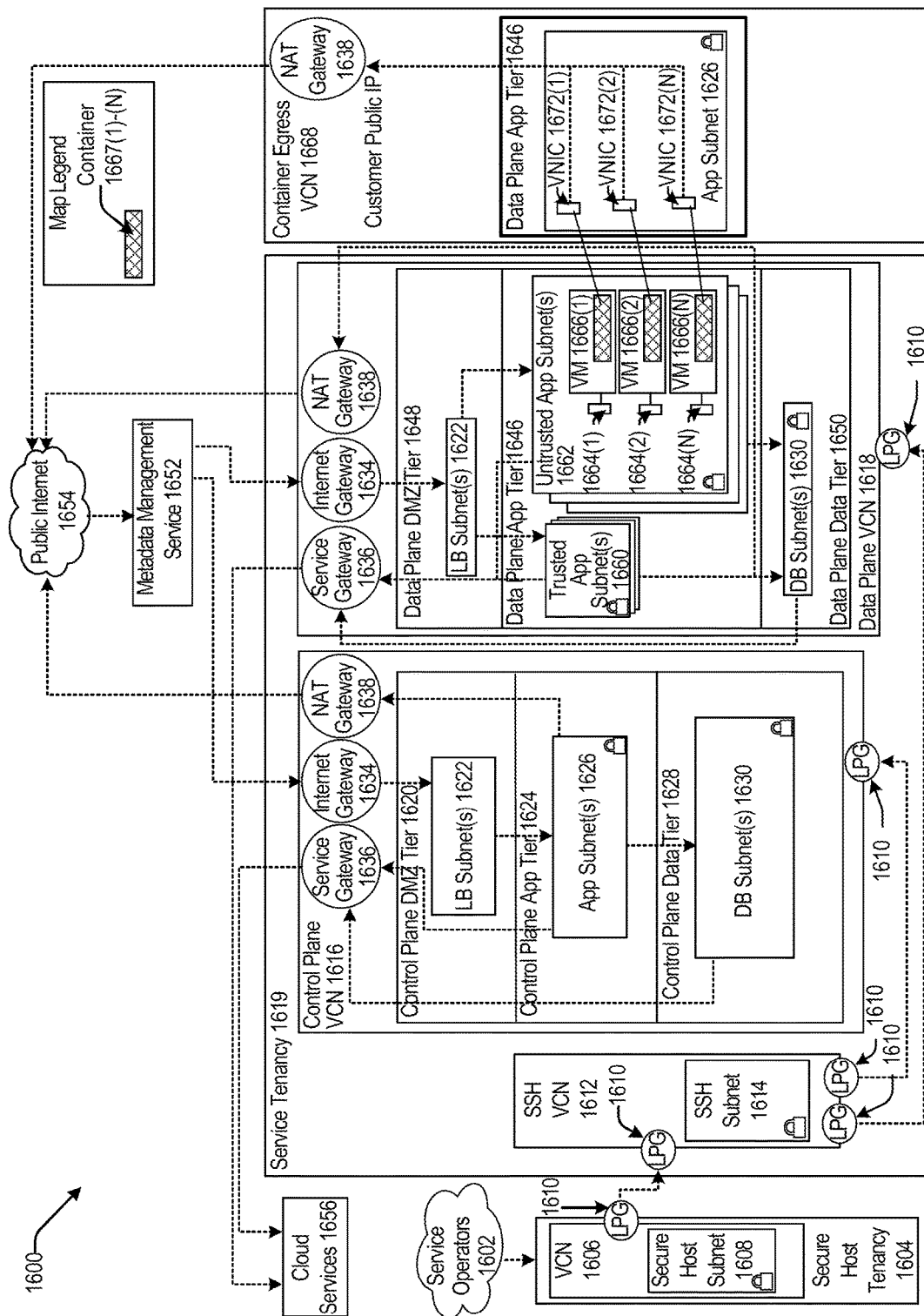
FIG. 16 is a block diagram 1600 illustrating another example pattern of an IaaS architecture, according to at least one embodiment.

FIG. 16 is a block diagram 1600 illustrating another example pattern of an IaaS architecture, according to at least one embodiment. Service operators 1602 (e.g. service operators 1302 of FIG. 13) can be communicatively coupled to a secure host tenancy 1604 (e.g. the secure host tenancy 1304 of FIG. 13) that can include a virtual cloud network (VCN) 1606 (e.g. the VCN 1306 of FIG. 13) and a secure host subnet 1608 (e.g. the secure host subnet 1308 of FIG. 13). The VCN 1606 can include an LPG 1610 (e.g. the LPG 1310 of FIG. 13) that can be communicatively coupled to an SSH VCN 1612 (e.g. the SSH VCN 1312 of FIG. 13) via an LPG 1610 contained in the SSH VCN 1612. The SSH VCN 1612 can include an SSH subnet 1614 (e.g. the SSH subnet 1314 of FIG. 13), and the SSH VCN 1612 can be communicatively coupled to a control plane VCN 1616 (e.g. the control plane VCN 1316 of FIG. 13) via an LPG 1610 contained in the control plane VCN 1616 and to a data plane VCN 1618 (e.g. the data plane 1318 of FIG. 13) via an LPG 1610 contained in the data plane VCN 1618. The control plane VCN 1616 and the data plane VCN 1618 can be contained in a service tenancy 1619 (e.g. the service tenancy 1319 of FIG. 13).

The control plane VCN 1616 can include a control plane DMZ tier 1620 (e.g. the control plane DMZ tier 1320 of FIG. 13) that can include LB subnet(s) 1622 (e.g. LB subnet(s) 1322 of FIG. 13), a control plane app tier 1624 (e.g. the control plane app tier 1324 of FIG. 13) that can include app subnet(s) 1626 (e.g. app subnet(s) 1326 of FIG. 13), a control plane data tier 1628 (e.g. the control plane data tier 1328 of FIG. 13) that can include DB subnet(s) 1630 (e.g. DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 13) and a network address translation (NAT) gateway 1638 (e.g. the NAT gateway 1338 of FIG. 13). The control plane VCN 1616 can include the service gateway 1636 and the NAT gateway 1638.

The data plane VCN 1618 can include a data plane app tier 1646 (e.g. the data plane app tier 1346 of FIG. 13), a data plane DMZ tier 1648 (e.g. the data plane DMZ tier 1348 of FIG. 13), and a data plane data tier 1650 (e.g. the data plane data tier 1350 of FIG. 13). The data plane DMZ tier 1648 can include LB subnet(s) 1622 that can be communicatively coupled to trusted app subnet(s) 1660 (e.g. trusted app subnet(s) 1560 of FIG. 15) and untrusted app subnet(s) 1662 (e.g. untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g. public Internet 1354 of FIG. 13).

The Internet gateway 1634 contained in the control plane VCN 1616 and contained in the data plane VCN 1618 can be communicatively coupled to a metadata management service 1652 (e.g. the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s)

1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
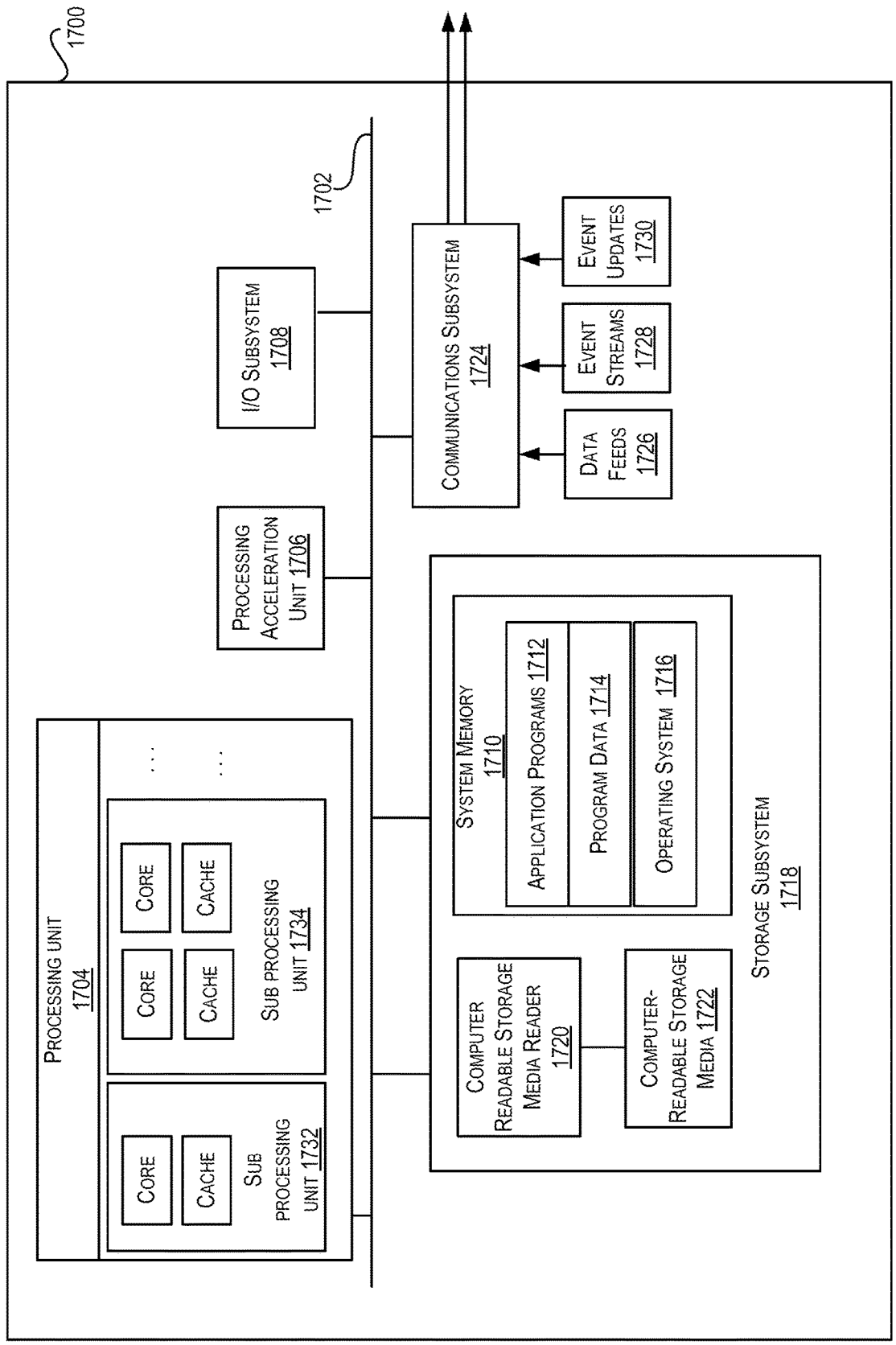
FIG. 17 illustrates an example computer system 1700, in which various embodiments may be implemented.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present disclosure.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
 receiving, by a security zone policy enforcement system in a cloud service provider infrastructure, a request to perform an operation on a resource;
 determining, by the security zone policy enforcement system, a compartment associated with the resource, the compartment associated with a set of one or more compartment policies;
 determining, by the security zone policy enforcement system, that the operation on the resource is permitted based on the set of one or more compartment policies;
 responsive to determining that the operation on the resource is permitted based on the set of one or more compartment policies, determining, by the security zone policy enforcement system, that the compartment is associated with a security zone, the security zone associated with one or more security zone policies;
 determining, by the security zone policy enforcement system, whether the operation on the resource is permitted or not based on the set of one or more security zone policies; and
 disallowing, by the security zone policy enforcement system, the operation to be performed on the resource upon determining that the operation on the resource is not permitted based on the set of one or more security zone policies.

2. The method of claim 1, wherein determining the compartment associated with the resource further comprises determining a compartment identifier of the compartment associated with the resource.

3. The method of claim 1, wherein the set of one or more compartment policies applicable to the resource comprise a union of one or more compartment policies associated with the compartment and one or more compartment policies associated with one or more parent compartments that are hierarchically related to the compartment.

4. The method of claim 1, further comprising:
 allowing the operation to be performed on the resource upon determining that the operation on the resource is permitted based on the set of one or more security zone policies.

5. The method of claim 1, wherein the set of one or more security zone policies applicable to the resource comprise a union of one or more security zone policies associated with the security zone and one or more security zone policies associated with one or more parent security zones that are hierarchically related to the security zone.

6. The method of claim 1, wherein a security zone policy in the set of one or more security zone policies is represented as a set of one or more expressions, wherein each expression in the set of expressions comprises a set of one or more conditions, and wherein each condition in the set of one or more conditions specifies a restriction on the operation to be performed on the resource.

7. The method of claim 6, wherein the restriction specifies criteria requiring encryption of the resource, criteria that restricts a movement of the resource from the compartment that the resource resides in or criteria that prohibits that resource from being accessible from the public internet.

8. The method of claim 7, wherein the restriction specifies criteria related to one or more secondary resources associated with the resource, wherein the one or more secondary resources impact the operation of the resource.

9. The method of claim 1, wherein the set of one or more security zone policies prohibit a specific configuration of the operation to be performed on the resource.

10. The method of claim 1, further comprising transmitting, by the security zone policy enforcement system, a result to a user, the result indicating that the operation was successfully performed on the resource.

11. The method of claim 1, further comprising transmitting, by the security zone policy enforcement system, a result to a user, wherein the result indicates that the operation was not successfully performed on the resource.

12. The system of claim 1, wherein a security zone policy in the set of one or more security zone policies is represented as a set of one or more expressions, wherein each expression in the set of expressions comprises a set of one or more conditions, and wherein each condition in the set of one or more conditions specifies a restriction on the operation to be performed on the resource.

13. The method of claim 1, wherein determining whether the operation on the resource is permitted or not based on the set of one or more security zone policies comprises determining that the operation is not permitted based on the set of one or more security zone policies.

14. The method of claim 1, wherein the cloud service provider infrastructure comprises at least a first tenant and a second tenant, and wherein a first compartment of the first tenant and a first compartment of the second tenant are associated with a first security zone of a plurality of security zones implemented by the security zone policy enforcement system.

15. A security zone policy enforcement system in a cloud service provider infrastructure, comprising:
 a processor; and
 a memory storing instructions that, when executed by the processor, configure the system to:
  receive a request to perform an operation on a resource;
  determine a compartment associated with the resource, the compartment associated with a set of one or more compartment policies;
  determine that the operation on the resource is permitted based on the set of one or more compartment policies;
  responsive to the determination that the operation on the resource is permitted based on the set of one or more compartment policies, determine that the compartment is associated with a security zone, the security zone associated with one or more security zone policies;
  determine whether the operation on the resource is permitted or not based on the set of one or more security zone policies; and
  disallowing the operation to be performed on the resource upon determining that the operation on the resource is not permitted based on the set of one or more security zone policies.

16. The system of claim 15 further comprising instructions to determine a compartment identifier of the compartment associated with the resource.

17. A non-transitory computer-readable medium having program code that is stored thereon, the program code executable by one or more processing devices for performing operations comprising:
 receiving, by a security zone policy enforcement system providing secure access to resources in a cloud service provider infrastructure, a first request to associate a compartment with a security zone, the compartment associated with a set of one or more compartment policies;

responsive to the first request, associating, by the security zone policy enforcement system, the compartment with the security zone, the security zone associated with a set of one or more security zone policies; and wherein as a result of associating the compartment with the security zone, the compartment is associated with the set of one or more security zone policies and the set of one or more compartment policies; and wherein performing an operation on a resource within the compartment is disallowed if the operation on the resource is not permitted based on at least one of the set of one or more compartment policies or the set of one or more security zone policies.

18. The non-transitory computer-readable medium of claim 17, further comprising:

receiving, by the security zone policy enforcement system, a second request to add another resource to the compartment; and responsive to the second request, determining, by the security zone policy enforcement system, access to the another resource based at least in part on the set of one or more compartment policies and the set of one or more security zone policies.

19. The non-transitory computer-readable medium of claim 17, wherein the set of one or more security zone policies prohibit a set of operations to be performed on the resource or prohibit a specific version of an operation to be performed on the resource.

20. The non-transitory computer-readable medium of claim 17, wherein a security zone policy in the set of one or more security zone policies is represented as a set of one or more expressions, wherein each expression in the set of expressions comprises a set of one or more conditions, and wherein each condition in the set of one or more conditions specifies a restriction on an operation to be performed on the resource.

21. The non-transitory computer-readable medium of claim 17, wherein performing an operation on the resource within the compartment is disallowed if the operation on the resource is permitted based on the set of one or more compartments policies and not permitted based on the set of one or more security zone policies.

\* \* \* \* \*

UNITED STATES PATENT AND TRADEMARK OFFICE
CERTIFICATE OF CORRECTION

PATENT NO. : 11,706,260 B2
APPLICATION NO. : 17/393347
DATED : July 18, 2023
INVENTOR(S) : Dozorets et al.

It is certified that error appears in the above-identified patent and that said Letters Patent is hereby corrected as shown below:

In the Drawings

On sheet 4 of 17, in FIG. 4, under Reference Numeral 420, Line 4, after "DETERMINED" delete "IN".

In the Specification

In Column 10, Lines 15-16, delete "expr1(context.part1l)" and insert -- expr1(context.part1) -- therefor.

In Column 20, Line 11, delete "request" and insert -- request. -- therefor.

In Column 25, Line 55, delete "("Create Subnet")" and insert -- ("CreateSubnet") -- therefor.

In Column 26, Line 10, delete "("Change SubnetCompartment")" and insert -- ("ChangeSubnetCompartment") -- therefor.

Signed and Sealed this
Fourth Day of June, 2024

Katherine Kelly Vidal
*Director of the United States Patent and Trademark Office*